US008682243B2

(12) United States Patent
Bienas et al.

(10) Patent No.: US 8,682,243 B2
(45) Date of Patent: Mar. 25, 2014

(54) NETWORK SELECTION DEVICE AND METHOD FOR SELECTING A COMMUNICATION NETWORK

(75) Inventors: Maik Bienas, Braunschweig (DE); Andreas Schmidt, Braunschweig (DE); Markus Dominik Mueck, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 190 days.

(21) Appl. No.: 13/191,479

(22) Filed: Jul. 27, 2011

(65) Prior Publication Data

US 2013/0029588 A1    Jan. 31, 2013

(51) Int. Cl.
*H04B 7/15* (2006.01)

(52) U.S. Cl.
USPC .............................. 455/11.1; 455/13.1; 455/16

(58) Field of Classification Search
USPC ................ 455/3.02, 427, 428, 430, 431, 7–9, 455/11.1, 12.1, 13.1, 13.2, 14–17; 370/226, 370/293, 246, 274, 279, 315, 316, 492, 501
See application file for complete search history.

(56) References Cited

U.S. PATENT DOCUMENTS

| | | | | |
|---|---|---|---|---|
| 6,985,724 | B2 * | 1/2006 | Fredriksson et al. | 455/426.1 |
| 7,062,768 | B2 * | 6/2006 | Kubo et al. | 718/105 |
| 7,853,202 | B1 * | 12/2010 | Visotsky et al. | 455/9 |
| 8,050,809 | B2 * | 11/2011 | Geiger et al. | 701/19 |
| 8,185,044 | B2 * | 5/2012 | Naden et al. | 455/11.1 |
| 2004/0047473 | A1 * | 3/2004 | Fredriksson et al. | 380/278 |
| 2007/0041351 | A1 | 2/2007 | Hazra et al. | |
| 2008/0019321 | A1 * | 1/2008 | Kim et al. | 370/332 |
| 2008/0080436 | A1 * | 4/2008 | Sandhu et al. | 370/338 |
| 2009/0088164 | A1 * | 4/2009 | Shen et al. | 455/436 |
| 2010/0182916 | A1 * | 7/2010 | Drewes et al. | 370/252 |
| 2010/0329188 | A1 * | 12/2010 | Jen | 370/328 |
| 2011/0038284 | A1 * | 2/2011 | Senarath et al. | 370/279 |
| 2011/0117907 | A1 * | 5/2011 | Hooli et al. | 455/422.1 |

FOREIGN PATENT DOCUMENTS

| | | | |
|---|---|---|---|
| EP | 1667481 | A1 | 6/2006 |
| WO | 2010006650 | A1 | 1/2010 |

OTHER PUBLICATIONS

3GPP TS 36.300 V9.4.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), Jun. 2010, pp. 1-171.
3GPP TS 36.304 V9.3.0 3rd Generation Partnership Project; Technical Specification Group Radio Access Network; Evolved Universal Terrestrial Radio Access (E-UTRA); User Equipment (UE) procedures in idle mode (Release 9); Jun. 2010; pp. 1-32.
3GPP TS 36.331 V9.3.0 3rd Generation Partnership Project; Technical Specification Group Radio Access Network; Evolved Universal Terrestrial Radio Access (E-UTRA); Radio Resource Control (RRC); Protocol specification (Release 9); Jun. 2010, pp. 1-250.

* cited by examiner

*Primary Examiner* — Dominic E Rego

(57) ABSTRACT

A network selection device is described comprising a determining circuit configured to determine an expected suitability level of a communication connection for a communication terminal provided by means of a cellular radio communication network and by means of a relaying subscriber terminal of the cellular radio communication network and a decider configured to decide, based on the determined expected suitability level, whether the communication terminal should use a communication connection provided by means of the cellular radio communication network and by means of the relaying subscriber terminal of the cellular radio communication network.

30 Claims, 13 Drawing Sheets

NETWORK SELECTION DEVICE AND METHOD FOR SELECTING A COMMUNICATION NETWORK

TECHNICAL FIELD

Embodiments generally relate to a network selection device and a method for selecting a communication network.

BACKGROUND

In cellular radio communication networks, a subscriber terminal may be used as a relay node to provide a so-called opportunistic network, for example to expand the coverage area of the radio communication network, to enable more efficient radio resource usage, or to increase communication quality. It is desirable that communication terminals can efficiently use such opportunistic networks.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
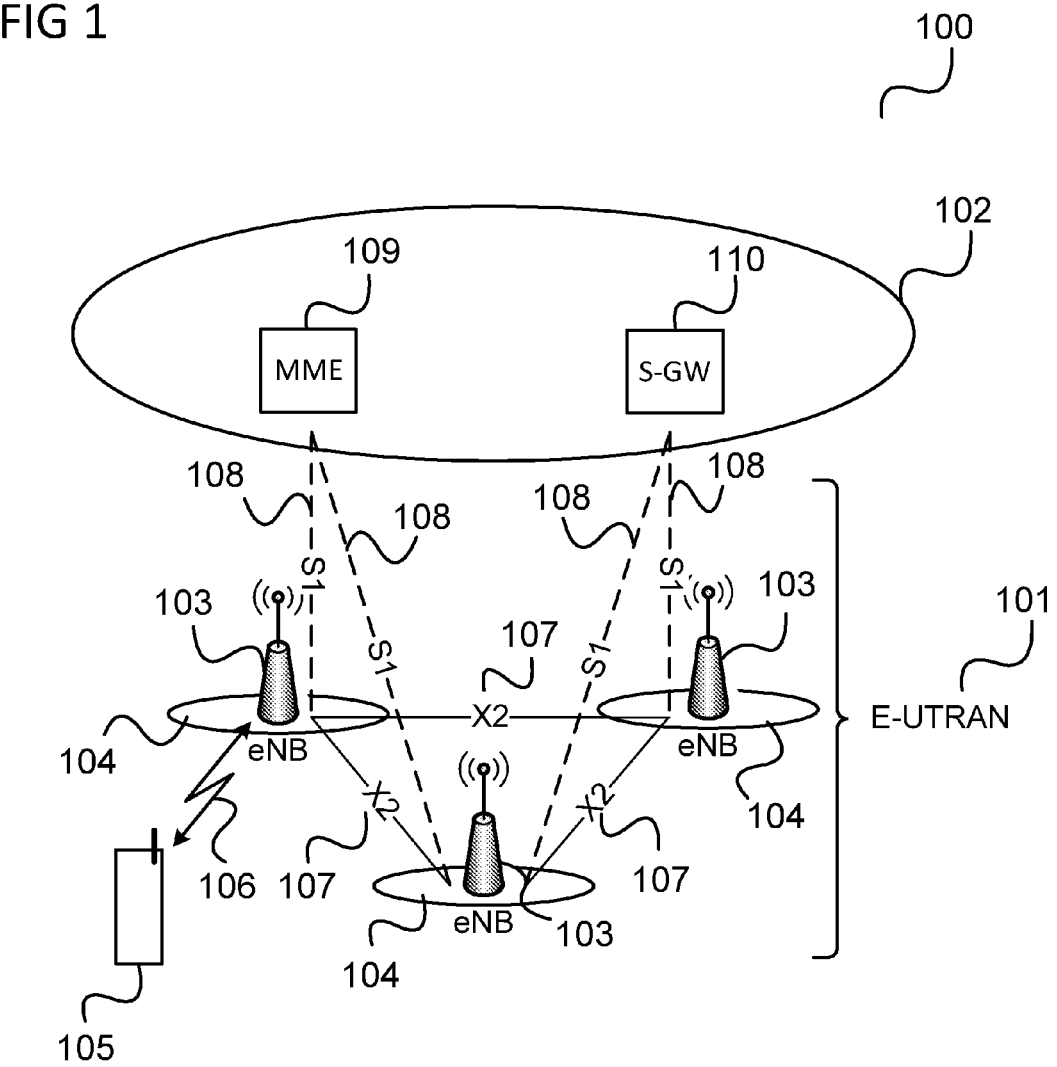
FIG. 1 shows a communication system according to an embodiment.

FIG. 1 shows a communication system 100 according to an embodiment.

The communication system 100 is a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:
  Functions for Radio Resource Management: Radio Bearer Control, Radio Admission Control, Connection Mobility Control, dynamic allocation of resources to UEs 105 in both uplink and downlink (scheduling);
  IP header compression and encryption of user data stream;
  Selection of an MME 109 at UE 105 attachment when no routing to an MME 109 can be determined from the information provided by the UE 105;
  Routing of User Plane data towards Serving Gateway (S-GW) 110;
  Scheduling and transmission of paging messages (originated from the MME);
  Scheduling and transmission of broadcast information (originated from the MME 109 or O&M (Operation and Maintenance));
  Measurement and measurement reporting configuration for mobility and scheduling;
  Scheduling and transmission of PWS (Public Warning System, which includes ETWS (Earthquake and Tsunami Warning System) and CMAS (Commercial Mobile Alert System)) messages (originated from the MME 109);
  CSG (Closed Subscriber Group) handling.

In the following, it is assumed that the base stations 103 may support various radio access technologies. For example, a base station 103 may provide a radio communication connection via the air interface between itself and the mobile terminal 105 according to LTE, UMTS, GSM (Global System for Mobile Communications), and EDGE (Enhanced Data Rates for GSM Evolution) radio access. Accordingly, the radio access network may operate as an E-UTRAN, a UTRAN, or a GERAN (GSM EDGE Radio Access Network). Analogously, the core network 102 may include the functionality of an EPC, a UMTS core network or a GSM core network. Two base stations 103 that support communication according to different radio access technologies may accordingly be coupled with different core networks 102 and belong to different radio access networks 101. Further, the first interface 107 may for example not be present between two base stations 103 that support different radio access technologies.

The mobile terminal 105 may communicate with the radio access network 101 through the air interface (also referred to as radio interface) 106 via the base stations 103 while moving around. The radio interface 106 between the mobile terminal 105 and the radio access network 101 is thus implemented by providing the base stations 103 dispersed throughout the coverage area of the communication system 100 (e.g. including one or more PLMNs, public land mobile networks).

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighbouring mobile radio cells 104. The transfer of calls from mobile radio cell 104 to mobile radio cell 104 is termed handover (or handoff).

A handover may also occur between base stations 103 operating according to different radio access technologies. This is illustrated in FIG. 2.

Figure 2:
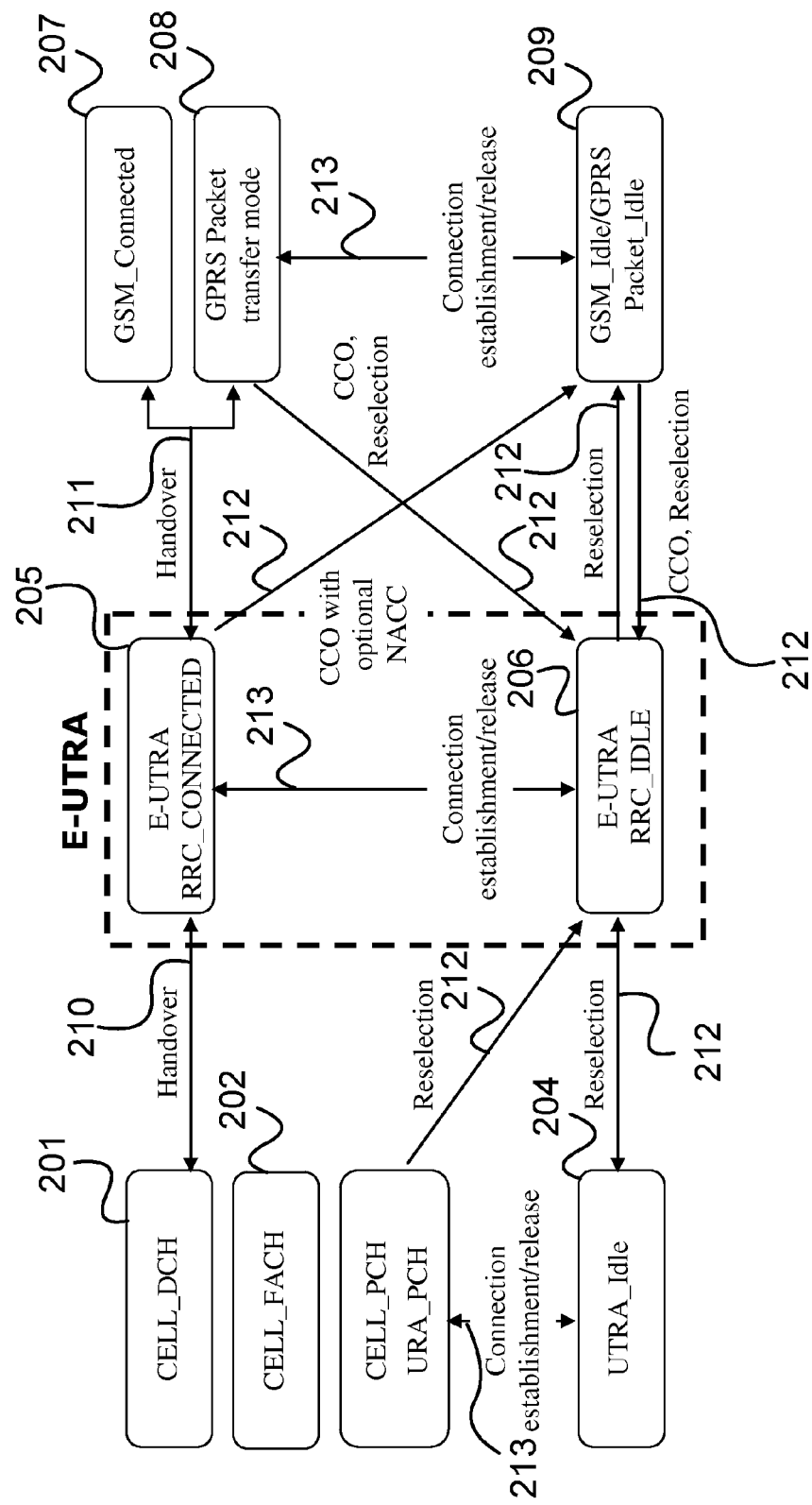
FIG. 2 shows a state diagram according to an embodiment.

FIG. 2 shows a state diagram 200 according to an embodiment.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. FIG. 2 can be seen to illustrate the mobility support between E-UTRA, UTRA and GERAN.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a connection is released or a connection is established.

The two RRC (Radio Resource Control) states RRC Idle and RRC Connected in E-UTRA can be characterised as follows:

RRC Idle
  Mobility is controlled by the mobile terminal 105.
  The mobile terminal 105
    may acquire system information (SI);
    monitors a paging channel to detect incoming calls and SI change;
    performs neighboring cell measurements for the cell (re-)selection process.

RRC Connected
A mobile terminal 105 is in RRC_CONNECTED when an RRC connection has been established.
  Mobility is controlled by the radio access network 101 (handover and cell change order).
  The mobile terminal 105
    may acquire system information (SI);
    monitors a paging channel and/or SIB (system information block) Type 1 content to detect SI change;
    performs neighboring cell measurements and measurement reporting to assist the network in making handover decisions.

A base station 103 may send out information in broadcast mode such that it is the same for all mobile terminal 105 that are residing within the coverage area of the base station 103. This is illustrated in FIG. 3.

Figure 3:
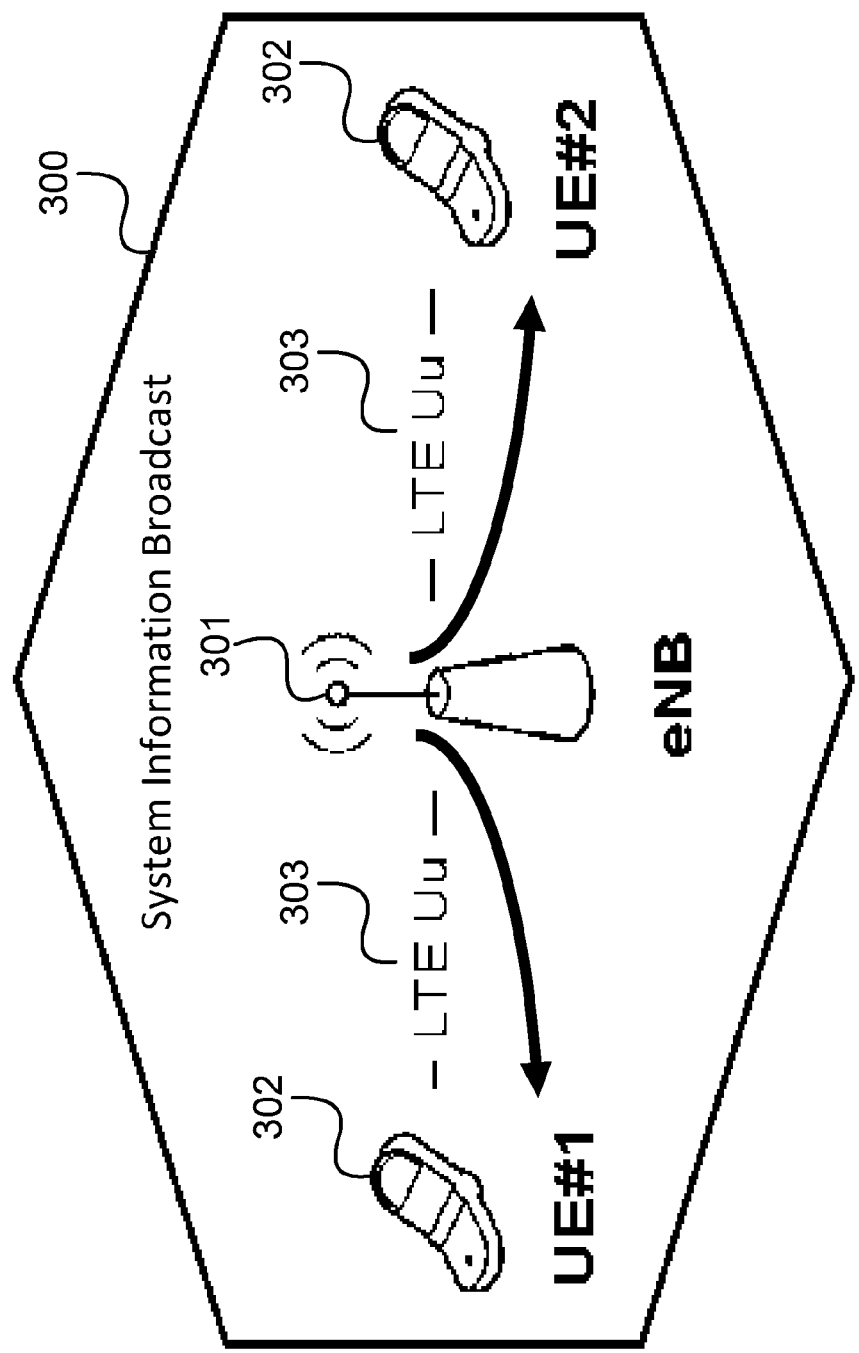
FIG. 3 shows a mobile radio cell according to an embodiment.

FIG. 3 shows a mobile radio cell 300 according to an embodiment.

The mobile radio cell 300 for example corresponds to a mobile radio cell 104 and is operated by a base station 301 for example corresponding to one of the base stations 103. Mobile terminals 302 are located in the mobile radio cell 300 and receive information from the base station 301 via broadcast over air interface 303 (e.g. the LTE Uu interface in case of LTE).

For example, in case of LTE, all mobile terminals 302 in RRC_IDLE located in the mobile radio cell 300 receive the same pieces of broadcast information. Unlike for mobile terminals in RRC_CONNECTED there is no dedicated signaling for mobile terminals 302 in RRC_IDLE state.

As mentioned above a mobile terminal 105 in RRC_IDLE is responsible for its own mobility. It performs reception quality measurements on neighbouring mobile radio cells 104 (i.e. in mobile radio cells 104 neighbouring the one on which it is camping) in order to find mobile radio cells 104 better suited for communication with the radio access network 101. A reception quality measurement on a mobile radio cell may include the measuring of the reception quality of signals (such as pilot signals) transmitted by a base station 103 for the operation of this mobile radio cell 104. For example, according to LTE, E-UTRAN 101 may configure mobile terminals 105 to perform such reception quality measurements by transmitting a NCL (Neighbour Cell List) to the mobile terminals 105 in broadcast mode.

The NCL is a part of the mobile communication system's 100 System Information (SI).

According to one embodiment, in accordance with LTE, when the UE 105 is switched on, a PLMN (Public Land Mobile Network) is selected by the Non-Access-Stratum (NAS) of the communication system 100. For the selected PLMN, one or more associated RATs may be set for the UE 105. The NAS provides a list of equivalent PLMNs, if available, that the AS (Access Stratum) uses for cell selection and cell reselection. During cell selection the UE 105 searches for a suitable cell of the selected PLMN and chooses that cell 104 to provide available services. Furthermore, the UE 105 tunes to the chosen cell's downlink control channel. This is referred to as "camping on the cell". In a next step the UE 105 registers (if necessary) its presence, by means of a NAS registration procedure, in the Tracking Area (TA) of the chosen cell 104. The result of a successful Location Registration is that the selected PLMN becomes the registered PLMN. If the UE 105 finds a more suitable cell 104, according to the cell reselection criteria, it re-selects onto that cell and camps on it. If the new cell does not belong to the Tracking Area (TA) the UE 105 is already registered with a new Location Registration is performed by the UE.

A UE 105 may for example camp on a cell 104 when it is in RRC_IDLE state for the following reasons:
 a) It enables the UE 105 to receive System Information (SI) from the PLMN.
 b) When registered and if the UE 105 wishes to establish an RRC connection, it can do this by initially accessing the radio access network 101 on the UL control channels of the cell 104 on which it is camped.
 c) If the PLMN receives a call for the registered UE, it knows the Tracking Area (TA) in which the UE 105 is camping. It can then send a "paging" message to the UE 105 on the DL control channels of all the cells 104 assigned to this Tracking Area. The UE 105 may then receive the paging message because it is tuned to the control channel of the cell 104 and the UE 105 can respond on a corresponding UL channel.
 d) It enables the UE to receive PWS notifications.

Figure 4:
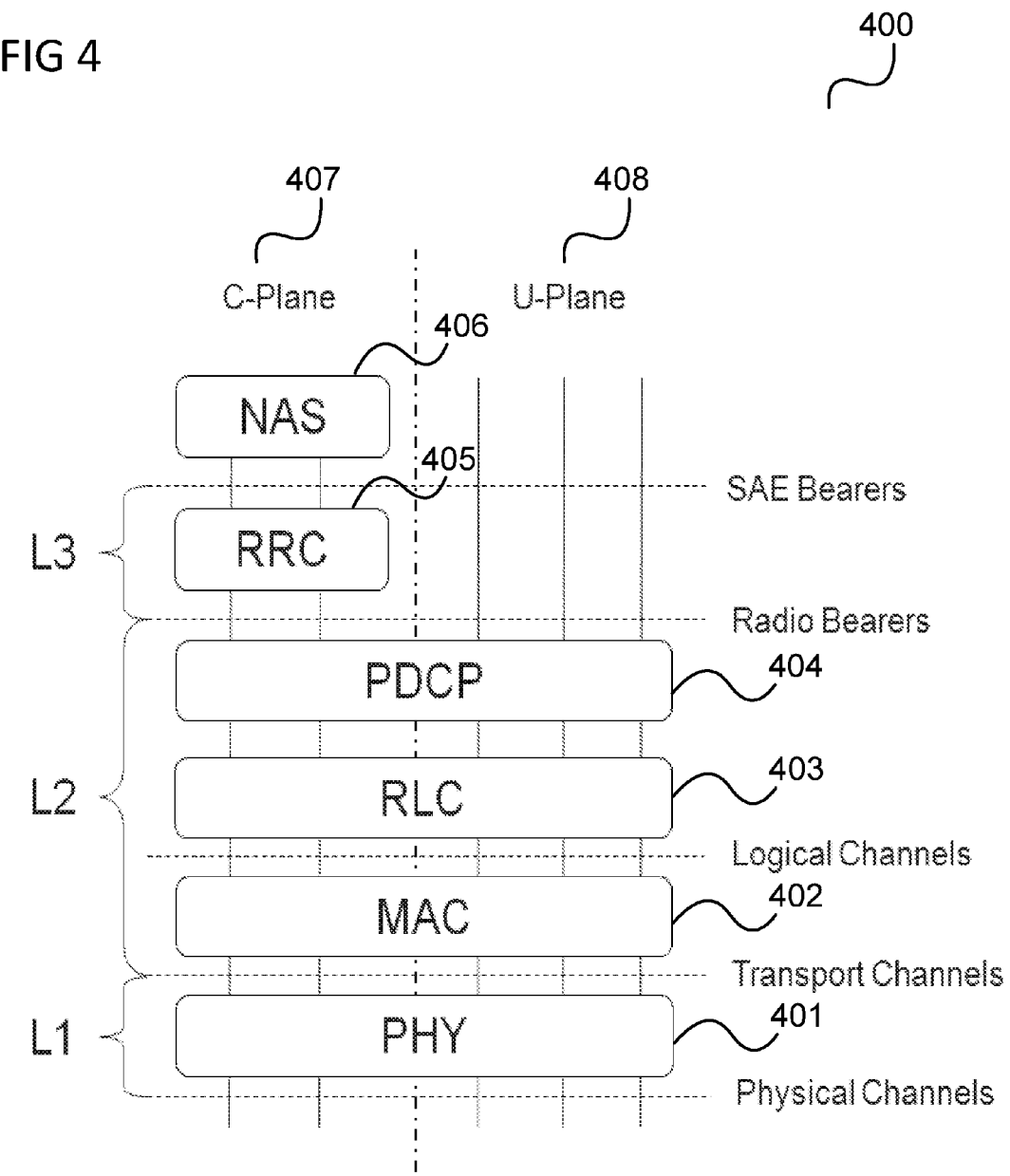
FIG. 4 shows a protocol structure according to an embodiment.

The protocols for the C-Plane and the U-Plane of the E-UTRAN 101 according to LTE are illustrated in FIG. 4.

FIG. 4 shows a protocol structure 400 according to an embodiment.

The protocol structure 400 includes a physical layer 401 (PHY), a MAC (Medium Access Control) layer 402, an RLC (Radio Link Control) layer 403, a PDCP (Packet Data Convergence Protocol) layer 404, an RRC (Radio Resource Control) layer 405, and a NAS (Non-Access Stratum) protocol layer 406. The protocol structure 400 can be divided into a Control Plane 407 (C-Plane) and a User Plane 408 (U-Plane). It should be noted that the NAS protocol layer 406 and the RRC (protocol) layer 405 are only present in the C-Plane.

The RRC protocol and all lower layer protocols (PDCP, RLC, MAC, and PHY) terminate in the eNB, while the NAS protocol layer 406 terminates in the MME 109 in the EPC 102. This is illustrated in FIG. 5.

Figure 5:
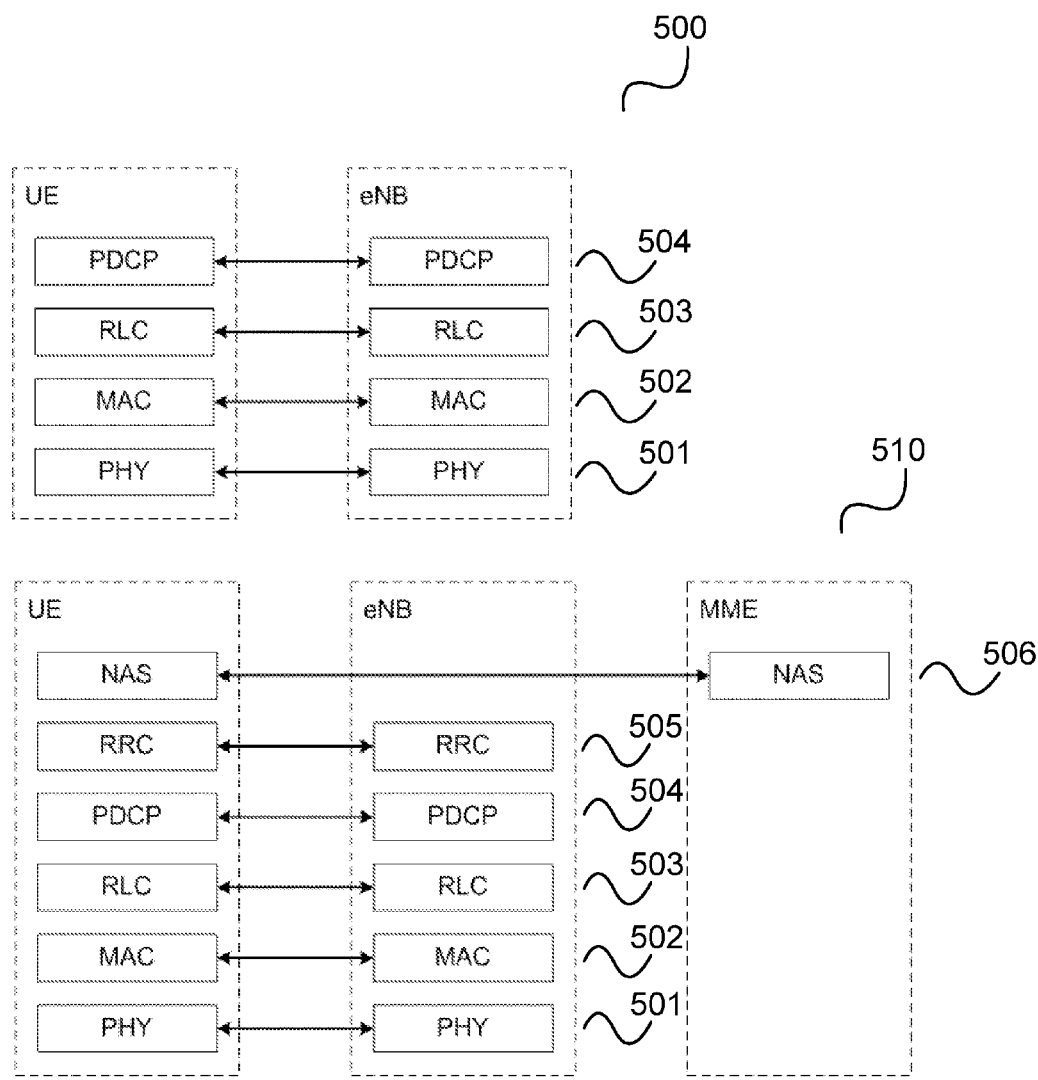
FIG. 5 shows a first protocol structure and a second protocol structure.

FIG. 5 shows a first protocol structure 500 and a second protocol structure 510.

The first protocol structure 500 corresponds to the U-Plane and the second protocol structure 510 corresponds to the C-Plane.

Analogously to the illustration in FIG. 4, the protocol structures 500, 510 include a physical layer 501, a MAC layer 502, an RLC (Radio Link Control) layer 503, a PDCP layer 504, an RRC layer 505, and a NAS (Non-Access Stratum) protocol layer 506.

In the physical layer 501, the MAC layer 502, the RLC layer 503, the PDCP layer 504, and the RRC layer the terminal points of the communication are the UE 511 and the eNB 512.

In the NAS protocol layer, the terminal points of the communication are the UE 511 and the MME 513.

3GPP (3rd Generation Partnership Project) has introduced LTE (Long Term Evolution) into the Release 8 version of UMTS (Universal Mobile Telecommunications System) standards. With LTE the UMTS air interface is further optimized for packet data transmission by improving the system capacity and the spectral efficiency. However, the enhancements for LTE technology are not restricted to the air interface. The core network architecture for 3GPP's LTE wireless communication standard is also enhanced. This endeavour is commonly known as SAE (System Architecture Evolution).

SAE refers to the evolution of the GPRS Core Network, with some differences:
 simplified architecture
 all IP (Internet protocol) Network (AIPN)
 support for higher throughput and lower latency radio access networks (RANs)
 support for, and mobility between, multiple heterogeneous RANs, including legacy systems as GPRS, but also non-3GPP systems (e.g. WiMAX)

According to the SAE architecture, the main component is the Evolved Packet Core (e.g. forming the core network of the communication system 100 illustrated in FIG. 1). The Evolved Packet Core (EPC) includes:
 A Mobility Management Entity (MME): The MME is the key control-node for the LTE radio access network (E-UTRAN) and, according to LTE, holds the following functions:
  NAS signaling;
  NAS signaling security;
  AS (Access Stratum) Security control;
  Inter CN (Core Network) node signaling for mobility between 3GPP access networks;
  Idle mode UE Reachability (including control and execution of paging retransmission);
  Tracking Area List (TAL) management (for UE in idle and active mode);
  PDN GW (Packet Data Network Gateway) and Serving GW selection;
  MME selection for handovers with MME change;
  SGSN (Serving GPRS (General Packet Radio System) Support Node) selection for handovers to 2G or 3G 3GPP access networks;
  Roaming;
  Authentication;
  Bearer management functions including dedicated bearer establishment;
  Support for PWS (which includes ETWS and CMAS) message transmission;
  Optionally performing paging optimization.
 A Serving Gateway (S-GW): The S-GW holds, according to LTE, the following functions:
  The local Mobility Anchor point for inter-eNB handover;
  Mobility anchoring for inter-3GPP mobility;
  E-UTRAN idle mode downlink packet buffering and initiation of network triggered service request procedure;
  Lawful Interception;
  Packet routing and forwarding;
  Transport level packet marking in the uplink and the downlink;

Accounting on user and QCI (QoS (Quality of Service) Class Identifier) granularity for inter-operator charging;

Uplink and Downlink charging per UE, PDN, and QCI.

A PDN Gateway (P-GW): According to LTE, the PDN Gateway provides connectivity from the UE to external packet data networks by being the point of exit and entry of traffic for the UE. A UE may have simultaneous connectivity with more than one P-GW for accessing multiple PDNs. The P-GW performs policy enforcement, packet filtering for each user, charging support, lawful Interception and packet screening. Another key role of the P-GW is to act as the anchor for mobility between 3GPP and non-3GPP technologies such as WiMAX and 3GPP2 (CDMA 1X and EvDO (Evolution Data Optimized)).

In the following, the network architecture of a communication system (e.g. a 3GPP communication system) with three different Radio Access Networks (RANs) is described with reference to FIG. 6 (for the non-roaming case).

Figure 6:
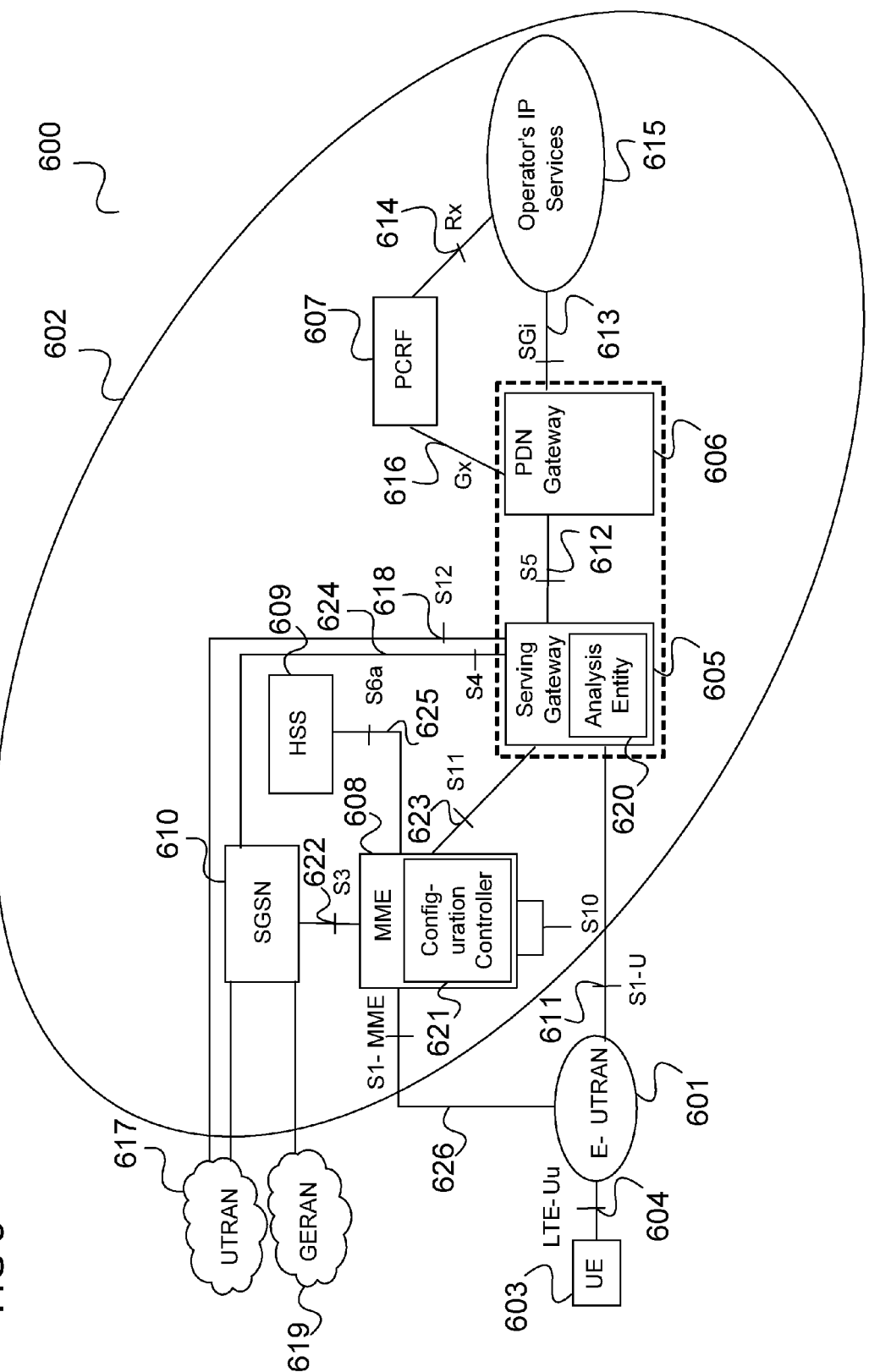
FIG. 6 shows a communication system according to an embodiment.

FIG. 6 shows a communication system 600 according to an embodiment.

The communication system 600 includes an E-UTRAN 601 and a core network 602.

The communication system 600 corresponds to the communication system 100 wherein in FIG. 1, the E-UTRAN 101, 601 is shown in higher detail while in FIG. 6, the core network 102, 602 is shown in higher detail.

A mobile terminal 603 which may correspond to the mobile terminal 105 may connect to the E-UTRAN 601 by means of an air interface (Uu interface) 604.

The core network 602 includes a Serving Gateway 605, a PDN (Packet Data Network) Gateway 606, a PCRF (Policy and Charging Rules Function) 607, an MME (Mobility Management Entity) 608, and a HSS (Home Subscriber Server) 609, an SGSN (Serving GPRS (General Packet Radio Service) Support Node) 610.

The E-UTRAN 601 exchanges information or commands with the Serving Gateway 605 by means of an S1-U interface 611. The Serving Gateway 605 is coupled to the PDN Gateway 606 by means of an S5 interface 612. The PDN Gateway 606 and the PCRF 607 may access IP (Internet Protocol) services 615 (i.e. may access, for example, corresponding servers) provided by the operator of the mobile communication system 600 by means of an SGi interface 613 and an Rx interface 614, respectively.

The PCRF 607 is coupled to the PDN Gateway 606 by means of a Gx interface 616. The Serving Gateway 605 is coupled by means of an S4 interface 624 with the SGSN 610. The Serving Gateway 605 may further be coupled to an UTRAN (i.e. a radio access network according to UMTS) 617 via a S12 interface 618. The MME 608 is coupled by means of an S6a interface 625 with the HSS 609. The MME 608 is further coupled by means of an S1-MME interface 626 to the E-UTRAN 601.

The SGSN 610 may support legacy access to the UTRAN 617 and/or a GERAN (GSM (Global System for Mobile Communications) EDGE (Enhanced Data Rates for GSM Evolution) Radio Access Network) 619. The SGSN 610 is coupled with the MME 608 via an S3 interface 622. The Serving Gateway 605 is coupled with the MME 608 via an S11 interface 623.

GERAN is also referred to as 2G and 2.5G. UTRAN is a collective term for the NodeBs and Radio Network Controllers (RNCs) which make up the UMTS radio access network. This communications network, commonly referred to as 3G, can carry many traffic types from real-time Circuit Switched to IP based Packet Switched. The UTRAN includes at least one NodeB (i.e. a UMTS base station) that is connected to at least one Radio Network Controller (RNC). An RNC provides control functionalities for one or more NodeBs. A NodeB and an RNC can be the same device, although typical implementations have a separate RNC located in a central location serving multiple NodeBs. An RNC together with its corresponding NodeBs are called the Radio Network Subsystem (RNS). There can be more than one RNS present per UTRAN.

The E-UTRAN 601 is the 3GPP Radio Access Network for LTE (3.9G) that is currently being worked on. The E-UTRA air interface uses OFDMA for the downlink (i.e. for the transmission direction from the base station to the mobile terminal) and Single Carrier FDMA (SC-FDMA) for the uplink (i.e. for the transmission direction from the mobile terminal to the base station). It employs MIMO (Multiple Input Multiple Output) with up to four antennas per (base and user) station. The use of OFDM enables E-UTRA to be much more flexible in its use of spectrum than the older CDMA based systems, such as UTRAN. OFDM has a link spectral efficiency greater than CDMA, and when combined with modulation formats such as 64QAM, and techniques as MIMO, E-UTRA is expected to be considerably more efficient than W-CDMA (Wideband Code Division Multiple Access) with HSDPA (High Speed Downlink Packet Access) and HSUPA (High Speed Uplink Packet Access).

The measurement configuration in E-UTRAN is as follows in RRC_CONNECTED state and RRC_IDLE state:

In RRC_CONNECTED measurement configuration is part of the RRCConnectionReconfiguration RRC Message (by means of the information element "MeasConfig"). This message is transmitted in downlink direction via dedicated channels (DCCH) upon connection setup and it also triggers the beginning of measurements. Within the information element "MeasConfig" new entries for Measurement Objects, Reporting Criteria, etc. can be added, modified or removed allowing maximum flexibility for the Mobile Network Operator (MNO) to configure a particular UE.

In RRC_IDLE state, measurement configuration is part of the System Information sent out in broadcast mode to all UEs in coverage of a given cell. The SIB(System Information Block)-Types #3 through #8 specify the measurement details. Reception of a certain SIB-Type triggers the corresponding measurement procedure. A UE in RRC_IDLE state derives the following information from the cell it is camping on to scan for better suited cells:

Frequency, priority and bandwidth of neighboring E-UTRAN-cells;

Frequency, priority and bandwidth of neighboring inter-RAT cells;

Parameters for corrections of cell selection criterion and ranking criterion of serving and neighboring cells; and Thresholds for reducing measurement amount (for fast moving UEs).

The use of dedicated measurement control for RRC_IDLE state is possible through the provision of "UE specific priorities", i.e. priorities for performing inter-frequency measurements. The common priorities can be overwritten by E-UTRAN through dedicated signaling to individual UEs upon transition from RRC_CONNECTED state to RRC_IDLE state. This can even be set subscription based by MME. In this case the MME provides a UE specific "Index to RAT/Frequency Selection Priority" (RFSP Index) to the corresponding eNB via the S1 interface.

According to various embodiments, mobile radio communication devices, for example mobile terminals (for example UEs), may be equipped with multiple radio access technologies (RATs). Cellular technologies may be used to connect permanently to a cellular network, e.g. GSM, UMTS, LTE, and LTE-Advanced and short range technologies may be designed to get sporadically access, e.g. Bluetooth and WiFi (e.g. IEEE 802.11). For example, mobile phones may be equipped with cellular and short range transmitters.

Cellular networks typically provide good coverage and availability with seamless mobility, and the variety of types of offered services on the one hand, but the expensive and limited licensed spectrum used for the air interface on the other hand. In other words, cellular techniques may provide seamless access to the network but usage may be expensive.

In contrast to this, short range technologies are typically used in the unlicensed bands which may be free of charge and may offer more bandwidth and more throughput per user, for example the ISM (Industrial Scientific Medical) band. According to various embodiments, the coverage area of short range technologies may be small (for example less than 100 m) and mobility between different access points may not be offered, because most of them may not be operated by the same operator but by different private individuals. In other words, short range techniques may provide large data rates at low costs, but seamless mobility may not be supported.

Both technologies have different properties. According to various embodiments, properties of both technologies may be combined to provide cellular services via license free spectrum. This may be provided by "opportunistic networks" (ON) as illustrated in FIG. 7.

Figure 7:
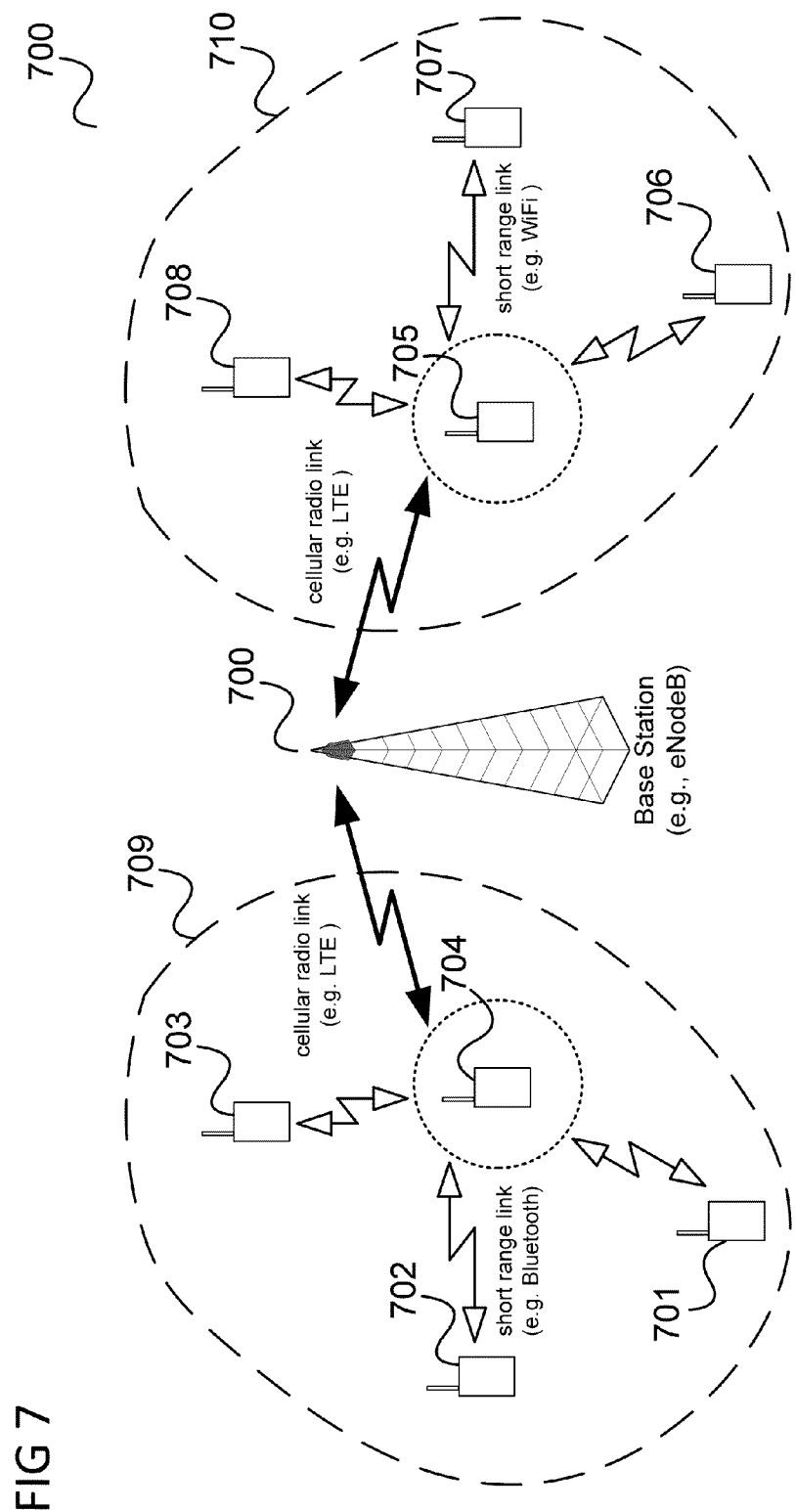
FIG. 7 shows a mobile radio communication system in accordance with an embodiment.

FIG. 7 shows a mobile radio communication system 700 in accordance with an embodiment.

The communication system 700 includes a base station 711 of a cellular mobile communication network, e.g. corresponding to one of the base stations 103 of the communication system 100 illustrated in FIG. 1.

Further, the communication system 700 includes a first mobile terminal 701, a second mobile terminal 702, a third mobile terminal 703, a fourth mobile terminal 704, a fifth mobile terminal 705, a sixth mobile terminal 706, a seventh mobile terminal 707, and an eighth mobile terminal 708. The first mobile terminal 701, the second mobile terminal 702, the third mobile terminal 703, and the fourth mobile terminal 704 form a first opportunistic network (ON) 709 and the fifth mobile terminal 705, the sixth mobile terminal 706, the seventh mobile terminal 707, and the eighth mobile terminal 708 form a second opportunistic network (ON) 710.

In the ONs 709, 710, the first mobile terminal 701, the second mobile terminal 702, the third mobile terminal 703, the sixth mobile terminal 706, the seventh mobile terminal 707, and the eighth mobile terminal 708 (also referred to as ON terminals) are using short range technology to connect to the fourth mobile terminal 704 and the fifth mobile terminal 705, respectively, which are for example centrally located in the respective ON 709, 710 and each acts as a relaying-node (or relaying UE, in other words a relaying subscriber terminal of the cellular radio communication network) in the respective ON 709, 710. The relaying UEs 704, 705 are connected with a cellular mobile communication network via a cellular RAT by means of the base station 711 and—at the same time—with the ON terminals 701, 702, 703, 706, 706, 708 via a short range radio technology. The relaying UEs 704, 705 forward data between the ON-Terminals 701, 702, 703, 706, 707, 708 and the cellular mobile communication network.

Thus, the ON terminals 701, 702, 703, 706, 707, 708 can use an unlicensed frequency band to obtain (and provide) services from (to) the cellular mobile communication network.

This concept may be desirable for the operator of the cellular network as the expensive resources from the licensed spectrum are saved due to more efficient usage. The users of the ON terminals 701, 702, 703, 706, 707, 708 can benefit from accessing the services of the cellular network with larger data rates and at lower cost. Business models based on reimbursement for the users providing the relaying UEs 704, 705 are possible.

The opportunistic networks 709, 710 are for example under the control of the Mobile Network Operator (MNO) of the cellular mobile communication network and offer via relaying-nodes full connectivity to the MNO's service offerings. For example, the first mobile terminal 701, the second mobile terminal 702, and the third mobile terminal 703 lack a certain capability (for example MIMO) to provide high data throughput and therefore make use of the relaying UE 704 that is capable of MIMO technology to get an appropriate connection to the base station 711. In wireless technology MIMO (Multiple-Input and Multiple-Output) is the use of multiple antennas at both the transmitter and receiver to improve communication performance. It is one of several forms of smart antenna technology. In LTE, support for MIMO in the UEs is optional.

In the second opportunistic network 710, for example, the sixth mobile terminal 706, the seventh mobile terminal 707, and the eighth mobile terminal 708 are located at the cell edge and suffer from very poor channel conditions to the cellular base station 711. Therefore, the sixth mobile terminal 706, the seventh mobile terminal 707, and the eighth mobile terminal 708 rely on the relaying UE 705 to get a connection to the base station 711. The radio link between the base station 711 and the relaying UEs 704, 705 of each ON 709, 710 may be based on any one of the well-known cellular RATs (for instance 3GPP UMTS with or without HSPA, or 3GPP LTE, or 3GPP LTE-Advanced).

The radio technologies used within the ONs 709, 710 may be based on a non-cellular (short range) radio technology, such as Bluetooth or WiFi (Wireless LAN, based on the IEEE 802.11 family of standards).

Opportunistic networks are typically Mobile Network Operator (MNO) governed (through resources, policies, and information/knowledge) and can be regarded as coordinated extensions of the MNO's infrastructure that typically exist only for a limited amount of time. Such dynamic infrastructure extensions enable application provisioning to users in the most efficient manner by involvement of different nodes of the infrastructure (cellular macro base stations, cellular femto cells, access points operating in the ISM band, etc.) and different mobile nodes.

According to various embodiments, methods for a mobile station (e.g., an 3GPP LTE UE) are provided to determine a suitable Opportunistic Network for usage based on one or more selection criteria.

Figure 8:
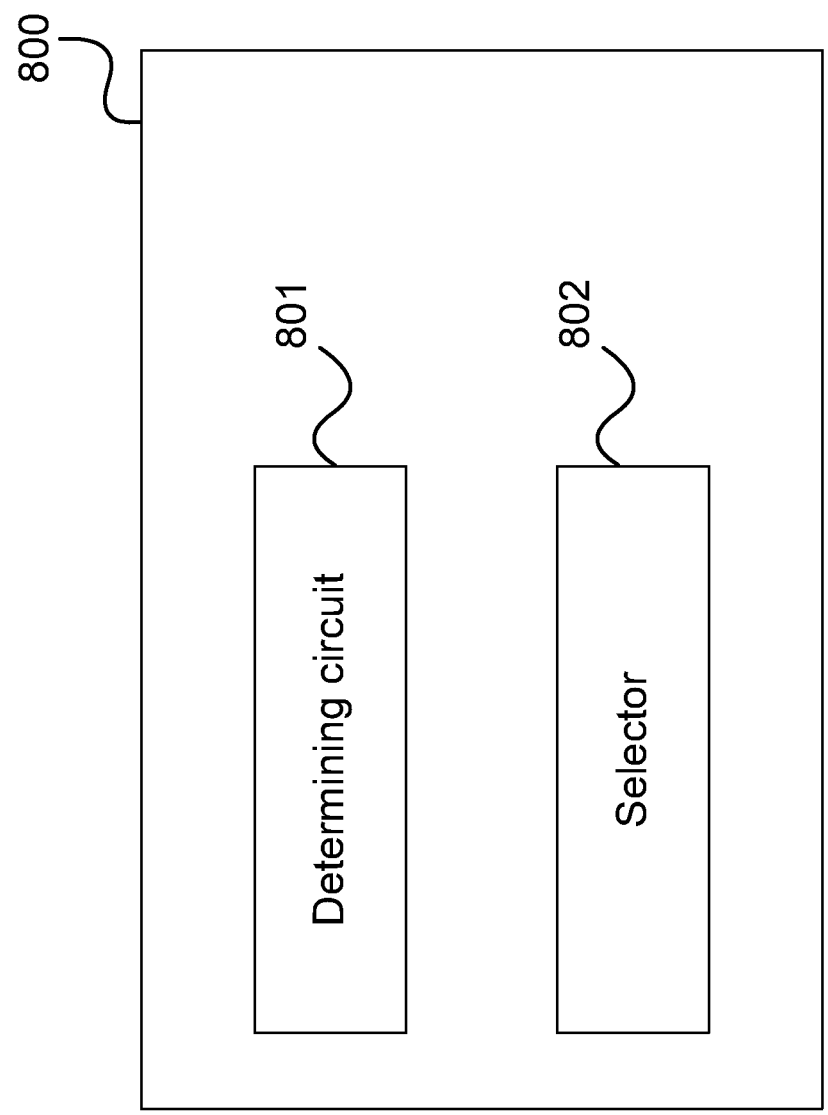
FIG. 8 shows a network selection device according to an embodiment.

FIG. 8 shows a network selection device 800 according to an embodiment.

The network selection device 800 includes a determining circuit 801 configured to determine an expected suitability level of a communication connection for a communication terminal provided by means of a cellular radio communication network and by means of a relaying subscriber terminal of the cellular radio communication network. Said communication connection for a communication terminal may comprise several communication sub connections (e.g. two hops) in sequence.

The first communication sub connection (first hop) may be provided by the relaying subscriber terminal. It may be a short range radio link in the unlicensed frequency spectrum, for example a link in the ISM band using Bluetooth or WiFi technology.

The second communication sub connection (second hop) may be provided by the cellular radio communication network. It may be a cellular radio link in the licensed frequency spectrum, for example a cellular radio link, such as the LTE Uu air interface.

In some embodiments the (resulting) communication connection for a communication terminal may be jointly provided by means of the cellular radio communication network and by means of the relaying subscriber terminal of the cellular radio communication network.

The network selection device 800 further includes a decider 802 configured to decide, based on the determined expected suitability level, whether the communication terminal should use a communication connection provided by means of the cellular radio communication network and by means of the relaying subscriber terminal of the cellular radio communication network (i.e., e.g., a communication connection jointly provided by means of the cellular radio communication network and by means of the relaying subscriber terminal).

According to one embodiment, the network selection device that evaluates the suitability (e.g. the quality) of a possible communication connection via a relaying subscriber terminal of the cellular radio communication network and the cellular radio communication network, i.e., in other words, a possible communication connection that is provided by an opportunistic network, resides in the communication terminal (e.g. a mobile station, a user equipment, or an ON terminal) or resides in the relaying subscriber terminal (e.g. a relaying node), or is a component of the cellular radio communication network (e.g. the infrastructure). The term 'infrastructure' for example includes the Radio Access Network (RAN) and the Core Network (CN). Determining the suitability level may for example be determining a parameter specifying how suitable the communication connection is for the communication terminal (i.e. to what degree the communication connection is suitable for the communication terminal, or equivalently, in its current state of operation (usage pattern), or equivalently, in its current location, or equivalently, its user). Depending on the result of the evaluation, the network selection device decides whether the mobile terminal should use a communication connection that may be jointly provided by the relaying subscriber terminal and the cellular radio communication network. For example, if it is decided that the communication terminal should use a communication connection provided via the relaying subscriber terminal and the cellular radio communication network, the communication terminal is asked to request that a communication connection is established via the relaying subscriber terminal and the cellular radio communication network or the network selection device itself requests that a communication connection is established via the relaying subscriber terminal and the cellular radio communication network. If it is decided that the communication terminal should not use a communication connection provided via the relaying subscriber terminal and the cellular radio communication network, the establishment of a communication connection provided in another way (i.e. by other means) is requested, for example a communication connection via the cellular mobile communication network (without any involvement of a relaying subscriber terminal) or via another opportunistic network (with involvement of another relaying subscriber terminal). The determined suitability level (e.g. in the form of a parameter value) can for example be compared with the suitability level of the communication connection provided in the other way and depending on which communication connection is more suitable according to the determined suitability levels the network selection device decides which communication connection should be used by the communication terminal.

According to one embodiment, the network selection device may be a distributed logic with parts residing in the communication terminal (e.g. a mobile station, a user equipment, or an ON terminal), in the relaying subscriber terminal (e.g. a relaying node), or in the cellular radio communication network (e.g. the infrastructure).

In the following, an opportunistic network is generally understood as a communication network provided by a relaying subscriber terminal of a cellular mobile radio communication network which is connected to the cellular radio communication network (e.g. to a base station of the cellular radio communication network) and which may provide communication connections to other communication terminals. It should be noted that the relaying subscriber terminal does not necessarily have to be a user handset (i.e. a cell phone) but may be another communication device operating as a subscriber terminal (e.g. as a UE or mobile station in a communciation system according to 3GPP), such as a WiFi or WLAN access point. For example, the relaying subscriber terminal may be any communication device supplied with a SIM (Subscriber Identity Module) or USIM (UMTS Subscriber Identity Module), i.e. generally a chip card allowing the communication device usage of the cellular mobile communication network. The relaying subscriber terminal may be a cellular communication device (i.e. a subscriber terminal, such as a handsets/cell phone) that can be operated without a removable chip card. These type of devices are often referred to as Mobile Stations or User Equipment with an 'embedded UICC' (eUICC), and are expected to show up in near future. The subscriber information needed to operate these devices (i.e. the (U)SIM data) can be stored, updated, and deleted without physically inserting, swapping, and removing a chip card. For this the cellular communication device may include a secure and trustworthy storage and/or processing environment, such as a TPM (Trusted Platform Module).

In other words, according to one embodiment, the relaying subscriber terminal may be a communication device using the cellular mobile communication network in accordance with a subscription to the cellular mobile communication network.

According to one embodiment, the relaying subscriber terminal is a user device, e.g. a mobile terminal, whose location is given by its user (i.e. the user has the physical control over the mobile terminal, i.e. over its location). The relaying subscriber terminal can be seen as a device that allows the Mobile Network Operator (MNO) to offer spontaneous coverage extensions for a certain limited time. Since the relaying subscriber terminal is a user device and can for example be moved anywhere, the quality of the connection between the relaying subscriber terminal and the base station (i.e. the second hop of the communication connection) cannot be guaranteed.

According to one embodiment, the determining circuit is configured to determine the expected suitability level in accordance with a suitability criterion.

According to one embodiment, the network selection device further includes a requesting circuit configured to request the establishment of a communication connection provided by means of the cellular radio communication network and by means of the relaying subscriber terminal if a decision has been made that the communication terminal should use a communication connection provided by means of the cellular radio communication network and by means of the relaying subscriber terminal.

According to one embodiment, the communication connection is a communication connection to a core network of the cellular radio communication network.

According to one embodiment, the communication connection comprises several communication sub connections (e.g., two hops) in sequence.

According to one embodiment, the first communication sub connection (first hop) is a short range radio link in the unlicensed frequency spectrum. It may provided by the relaying subscriber terminal According to one embodiment, the second communication sub connection (second hop) is a cellular radio link in the licensed frequency spectrum. It may be provided by the cellular radio communication network According to one embodiment, the decider is configured to decide whether the communication terminal should use a communication connection provided by means of the cellular radio communication network and by means of the relaying subscriber terminal based on a comparison of the determined expected suitability level with the expected suitability level of another communication connection.

According to one embodiment, the other communication connection is provided by means of the cellular radio communication network and by means of another relaying subscriber terminal.

According to one embodiment, the other communication connection is a communication connection to a core network of the cellular radio communication network.

According to one embodiment, the other communication connection is provided by means of the cellular radio communication network, e.g. a direct communication connection solely provided by means of the cellular radio communication network, i.e., without any involvement of another relaying subscriber terminal.

The other communication connection may also be provided by means of another relaying subscriber terminal of the cellular radio communication network.

According to one embodiment, the network selection device further includes a receiver configured to receive information based on which the expected suitability level can be determined and wherein the determining circuit is configured to determine the expected suitability level based on the received information.

According to one embodiment, the receiver is configured to receive the information from the communication terminal. The network selection device may for example receive information based on which the expected suitability level can be determined from the communication terminal as well as from components of the cellular radio communication network (including a component of the core network of the cellular radio communication network). In other words, the determination of the information may be distributed over a plurality of components involved in the (possible) communication via the communication connection and the network selection device gathers the information and performs the selection based on the gathered information.

According to one embodiment, the information includes at least one parameter describing a characteristic of the relaying subscriber terminal.

According to one embodiment, the information includes at least one parameter describing the expected transmission quality of the communication connection.

According to one embodiment, the information includes information about at least one of the expected reliability of the communication connection and the trustworthiness of the relaying subscriber terminal.

According to one embodiment, the information may include a battery charging level of the relaying subscriber terminal.

According to one embodiment, the information includes information based on which the expected suitability of the radio connection between the communication terminal and relaying subscriber terminal (first hop) and the expected suitability of the radio connection between the relaying subscriber terminal and an infrastructure component, such as a base station of the radio access network of the cellular radio communication network (second hop) can be determined.

According to one embodiment, the relaying subscriber terminal has a radio connection to a base station of a radio access network of the cellular radio communication network.

According to one embodiment, the network selection device is part of the communication terminal.

According to one embodiment, the network selection device further includes a receiver configured to receive an indication of the expected suitability level from the cellular radio communication network and wherein the determining circuit is configured to determine the expected suitability level based on the received indication.

According to one embodiment the network selection device is part of the cellular radio communication network.

Figure 9:
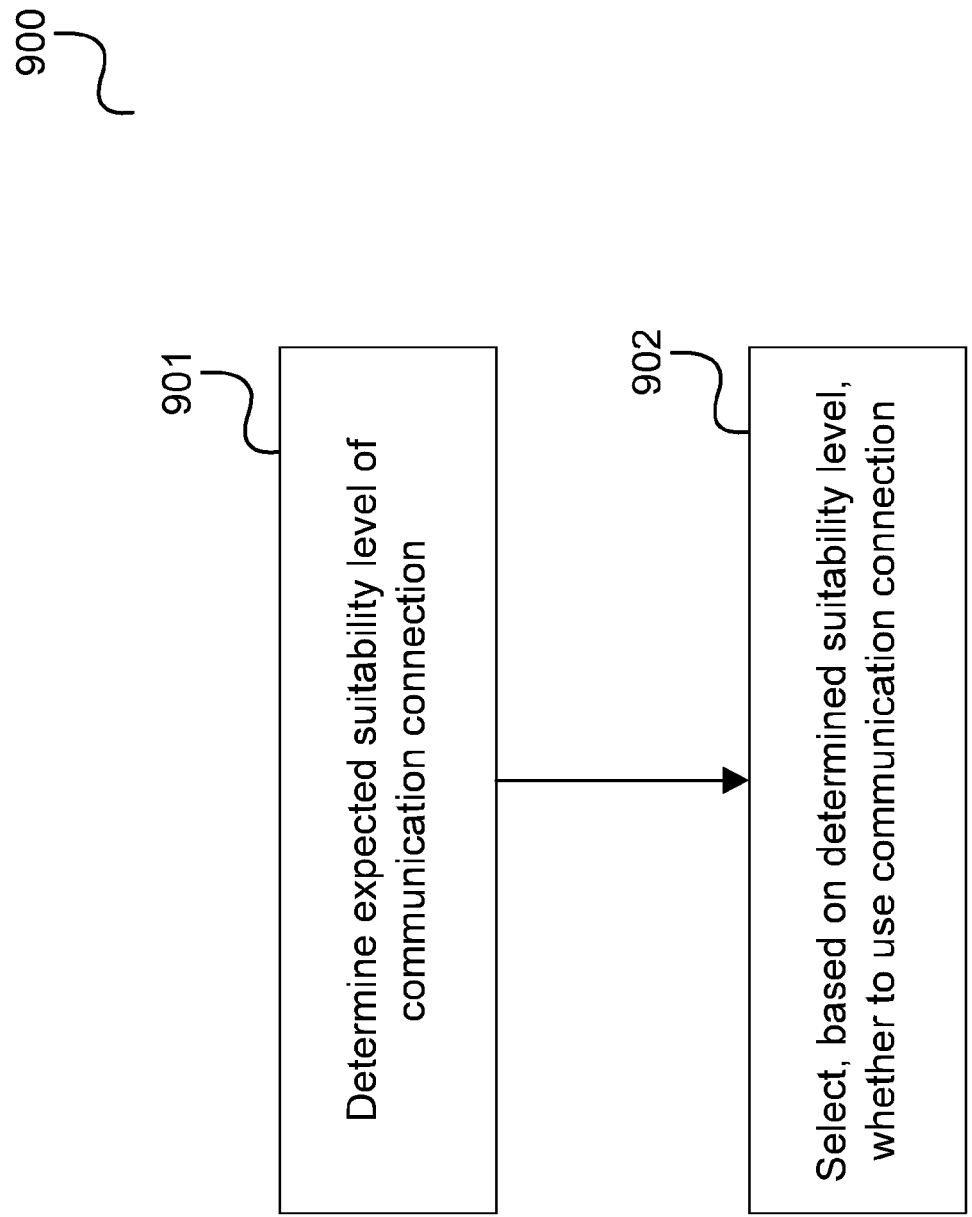
FIG. 9 shows a flow diagram according to an embodiment.

According to one embodiment, the network selection device further includes a transmitter configured to transmit a message to the communication terminal to request the communication terminal to establish a communication connection provided by means of the cellular radio communication network and by means of the relaying subscriber terminal if it has been decided by the decider that the communication terminal should use a communication connection provided by means of the cellular radio communication network and by means of the relaying subscriber terminal The network selection device 800 for example carries out a method as illustrated in FIG. 9.

FIG. 9 shows a flow diagram 900 according to an embodiment.

The flow diagram 900 illustrates a method for selecting a communication network.

In 901, an expected suitability level of a communication connection for a communication terminal provided by means of a cellular radio communication network and by means of a relaying subscriber terminal of the cellular radio communication network is determined.

In 902, it is decided, based on the determined expected suitability level, whether the communication terminal should use a communication connection provided by means of the cellular radio communication network and by means of the relaying subscriber terminal of the cellular radio communication network.

According to one embodiment, a communication device is provided including an ascertaining circuit configured to ascertain information based on which an expected suitability level of a communication connection for a communication terminal provided by means of a cellular radio communication network and by means of a relaying subscriber terminal of the cellular radio communication network can be determined and a transmitter configured to transmit the information to the network selection device described above.

According to one embodiment, a corresponding method for providing network selection information (i.e. information for network selection) according to the above communication device is provided.

It should be noted that embodiments described in context with the network selection device are analogously valid for the method for selecting a communication network, the communication device, and the method for providing network selection information and vice versa.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The methods and devices described above and the embodiments described in the following may be for example applied in scenarios in which a moving mobile terminal enters the coverage area of one or more already established opportunistic networks, or in which a mobile terminal (e.g. a stationary or slow moving mobile terminal) experiences formation of one or more new opportunistic networks in its vicinity (or in a combination of these scenarios).

The methods and devices described above and the embodiments described in the following may be applied for mobile terminals residing in RRC_IDLE state or in RRC_CONNECTED state. As in RRC_IDLE state mobility is mobile terminal based, the network selection device (e.g. an ON selection unit) may reside in the mobile terminal in this case. In RRC_CONNECTED state the network selection device (in other words the decision making unit) may reside in the eNB or in the core network of the cellular communication system.

It should be noted that disrespect of certain selection criteria during the ON selection process may result in making a wrong choice in the network selection. For instance, an ON might be chosen that does not allow for the UE's specific communication needs. In an extreme example, an ON could be chosen that is heavily overloaded and therefore fails to deliver the resources needed for exchange of data. Thus, an intelligent ON selection procedure may be of importance.

Various embodiments allow a mobile station to autonomously select an ON out of a variety of ONs. Further, according to various embodiments, a mobile station and the network side (i.e. a base station plus a core network, also referred to as 'infrastructure' in this description) collaborate on the selection of an ON. According to various embodiments, criteria as to whether an ON is deemed 'suitable' for a given UE are used.

Various embodiments relate to the determination of Opportunistic Networks (ONs) that are able to satisfactorily serve current or future mobile terminal needs or to allow for certain optional mobile terminal features. Specifically, according to various embodiments, methods to select a suitable Opportunistic Network (ON) based on a variety of selection criteria are provided. According to an embodiment, for a UE in RRC_IDLE state the network selection device (e.g. a decision making unit) resides in the UE, while for a UE in RRC_CONNECTED state, the network selection is done collaboratively between at least two of the UE, an eNB, and the core network, and the network selection device may be located in the UE or on the network side (e.g. in the eNB).

In the following, various embodiments are described in more detail with reference to the architecture illustrated in FIG. 7 as an example of a scenario in which more than one opportunistic networks are available such that a mobile terminal (e.g. a mobile terminal entering the coverage area of the first opportunistic network 701 and the second opportunistic network 710) may choose from among a plurality of opportunistic networks for a communication connection, for example to a core network of the cellular radio communication network which includes the base station 711. It should be noted that embodiments described for the selection between a plurality of opportunistic networks are also applicable for the selection between an opportunistic network and another radio access network, for example the selection between an opportunistic network and a direct communication connection to a cellular mobile communication network (i.e. via direct connection to the base station, in other words without a relaying subscriber terminal in between), or the selection between an opportunistic network and a local area network (such as a WLAN) providing access to the core network of a cellular radio communication network.

According to one embodiment, a metric for the determination and selection of an opportunistic network, i.e. for the rating of an opportunistic network to evaluate whether the opportunistic network is to be used for a communication connection by a mobile terminal, is used which is based on at least one of the properties and parameters described in the following. The mobile terminal for which a decision has been made that a communication connection by means of an opportunistic network is going to be used (or which available opportunistic network should be used) is referred to as possible ON terminal or just ON terminal in the following. It should however be noted that the ON terminal may actually not operate as an ON terminal in case that it is decided that it should not use a communication connection via any opportunistic network at all but, for example, rather a communication connection provided (directly) by the cellular radio communication network).

According to one embodiment, parameters (also referred to as evaluation parameters) of all radio links (also referred to as 'hops' as described above) of a potential connections between the mobile terminal (i.e. the (possible) ON terminal) and the core network are evaluated, i.e. parameters regarding all radio links forming the "chain" of radio links from the mobile terminal to the core network (including e.g. the (short range) radio link from the mobile terminal to the relaying subscriber terminal and the (cellular) radio link from the relaying subscriber terminal to the base station) are taken into account. This is for example done by using a metric (also referred to as evaluation metric) based on such evaluation parameters as described below which reflects the expected suitability level of a communication connection provided by an opportunistic network. The worst radio link (i.e. the radio link providing the lowest connection suitability) is typically more important for the overall connection suitability than the best radio link (i.e. the radio link providing the highest connection suitability) of the chain of radio links.

For example, the following parameters are used for evaluation of the expected suitability of the communication connection which are common for all radio links of the chain of radio links forming the communication connection:

Latency (for both c-plane and u-plane traffic);
Round Trip Time (RTT);
Number of nodes involved in data transmission;

For example, the following parameters are used for evaluation of the expected suitability of the communication connection which are individual for the radio links of the chain of radio links forming the communication connection:

Load (free/occupied resources);

Minimum guaranteed data rate/maximum available data rate;

Minimum required signal strength of received signal;

Offset value for received signal strength to avoid a selection ping-pong between different ONs;

Offset value for received signal strength to prioritize ON selection over macro cell selection (i.e. selection of a direct connection to the cellular radio communication network);

Maximum available signal strength for transmitting signals;

Battery charging level of relaying node (i.e. relaying subscriber terminal):

A reliability index that is calculated for every relaying node reflecting how stable recent connections between
  a) the relaying node and one or more other ON terminals, and/or
  b) the relaying node and the infrastructure (i.e. the network side, e.g. including the base station or the core network)
have been during a predefined time span (e.g. since formation of this ON, over the past n minutes, per minute/hour/etc.). The number of 'lost' ON-Terminals (i.e. the number of terminals having experienced an un-intended termination of connection) or the number of (successful or unsuccessful) connection re-establishment attempts may for instance be considered when this reliability index is calculated.

Type of node, e.g. indicating whether
  a) Trustworthy nodes are involved that are fully under control of the MNO; or
  b) At least one node is lacking trust; possibly because it is provided by a third party service provider or it is operating in unlicensed frequency bands (e.g., prone to contention or interference).

According to one embodiment, the determination of an expected suitability level of a communication connection is or includes the determination of an expected quality level of the communication connection. The expected quality level for example reflects the quality of communication provided by the communication connection, e.g. in terms of data rate, reliability, latency, etc. According to one embodiment, other characterisitics of a communication connection can also be regarded as a suitability of a communication connection, e.g. that a communication connection can be provided at low cost or is suitable with regard to the needs of the user of the ON terminal It should be noted that some of these properties and parameters may only be collectable and/or assessable by the ON terminal. On the other hand, parameters characterizing the radio link between the ON terminal and the relaying node may be used that can only be collected and/or assessed by the relaying node (e.g. parameters of the radio link between the base station and the relaying node) and some can only be collected and/or assessed by the base station or by an entity residing in the core network.

For a mobile terminal in RRC_IDLE state a metric may be used that allows the mobile terminal to autonomously assess the collected data (i.e. the evaluation parameters) and to autonomously select an ON based on its autarkic assessment (without any need to connect to the network side, i.e. the cellular radio communication network and/or the core network). In the contrary, according to one embodiment, for a mobile terminal in RRC_CONNECTED state the collected data may be conveyed from the ON terminal and/or the relaying node of the candidate opportunistic network (i.e. the opportunistic network which is rated, i.e. for which the mobile terminal determines whether to use a communication connection provided by it) to the MNO domain (i.e. the network side) and may be fed for example to the base station or an MME in the core network in order to perform the final calculations for ON selection (e.g. the determination of the value of the evaluation metric and the decision based on the evaluation metric, e.g. by comparing with suitability level generated for another communication connection or by comparing with a suitability level threshold). Still, the various components of the communication chain (i.e. the components involved in providing the radio link chain) may perform sub calculations.

Generally, according to one embodiment, an evaluation metric may be defined as

Metric $M_{res}$=function([Latency, RTT, ..., Reliability Index])

wherein the parameter list [Latency, RTT, ..., Reliability Index] includes one or more evaluation parameters, e.g. one or more of the parameters mentioned above.

The resulting value of the metric $M_{res}$ for a candidate opportunistic network can be calculated by multiple entities that are distributed throughout the various components of the communication chain. The components determining the metric may use different properties and parameters, for example because not every component may have the full range of parameters available. The components may thus determine different components of the metric which are then combined to get the resulting metric value.

As an example, two parts (i.e. metric components), namely $M_1$ (for instance calculated in the ON terminal) and $M_2$ (for instance calculated in the relaying node) are determined based on the following metric derivation functions (also referred to evaluation functions):

Metric $M_1 = c_{11} * f_{11}$ (Round-Trip-Time to Core

Network Entity in ms [normalized by the unit "ms"]) +

$c_{12} * f_{12}$ (Required Tx output Power in

Watts [normalized by the unit "Watts"]) +

$c_{13} * f_{13}$ (Number of "lost" On-Terminals in

Percent [normalized by the unit "Percent"])

Metric $M_2 = c_{21} * f_{21}$ (Time left to act as a relaying-node (based on battery charging level)

in ms [normalized by the unit "ms"]) +

$c_{22} * f_{22}$ (Guaranteed Data Rate into Core Network in bits/sec [normalized by the unit "bits/sec"])

Both functions are for example based on a sub-set of the evaluation parameters described above and could be used by the various components involved in the communication chain offered by a candidate opportunistic network to determine whether this ON is suitable for a particular ON terminal's current (and also for its projected future) communication needs. According to other embodiments, more than two metric components may be used. For example, in some cases it might be sensible to deploy a third or fourth metric component (for instance in the base station or in the core network) in order to refine the decision making process (e.g., in case the mobile terminal already resides in the RRC_CONNECTED state).

The constants $c_{11}$, $c_{12}$, $c_{13}$, and $c_{21}$, $c_{22}$ are for example positive, real valued constants that are used to assign a certain weight to the corresponding evaluation parameter value. For some evaluation parameters and evaluation functions a higher value indicates a better suitability (e.g. a better expected quality of the communication connection), while for other evaluation parameters and evaluation functions a lower number indicates better suitability (e.g. a better expected quality of the communication connection). Thus, in some cases, the reciprocal value of a certain evaluation parameter or evaluation function may be used.

In the above example for $M_1$, a small number of $M_1$ may for example be used as indication for a good suitability and reciprocal values are not used since a short Round-Trip-Time ($f_{11}$), a low Tx output Power ($f_{12}$), and a small number of lost ON-Terminals ($f_{13}$) result in a small overall value for $M_1$.

Similarly, in the above example for $M_2$, a small number of $M_2$ may be used to indicate good suitability. In this case, reciprocal values may be used for the remaining time a relaying-node is able to keep on acting as a relaying-node due to its battery capabilities ($f_{21}$) and for the guaranteed data rate ($f_{22}$), because high values of these parameters (making an ON suitable) would actually result in a high overall values for $M_2$.

The term "resulting metric" (e.g. $M_{res}$ as described above) in one embodiment refers to a property of a particular route through all relevant network nodes involved in data transmission (i.e. the communication chain made up of at least the ON terminal, at least one relaying node, and at least one infrastructure element, i.e. network side component). The term "infrastructure element" according to one embodiment refers to for example the base station (e.g. an eNB) or a core network entity (e.g. an MME).

According to one embodiment, if a certain property is applicable to more than one component and/or interface of the communication chain (depending on the property under consideration, for example processing time or data rate) the property of the weakest element (i.e. providing the lowest suitability) in the route under investigation (e.g. of the ON terminal, the relaying node, the base station, an MME, or an interface between any of these components) is taken into account for calculating the resulting suitability level (e.g. the resulting metric). For example, the necessary processing time of the slowest component influences the processing time of the entire system (i.e. the entire chain) negatively and the data rate of the slowest interface has a bad influence on the data rate of the entire system.

Further, according to one embodiment, the relaying node can prioritize the access to the cellular radio link (e.g. an LTE air interface connection) for an ON terminal by assigning only a subset of the available bandwidth to a communication connection provided for the ON terminal An ON terminal can thus be excluded from participating in the ON or the QoS of the communication connection provided for the ON terminal can be limited.

In the following, a procedure for ON selection for a UE in RRC_CONNECTED state (which is the (possible) ON terminal in this case) is described with reference to FIG. 10.

Figure 10:
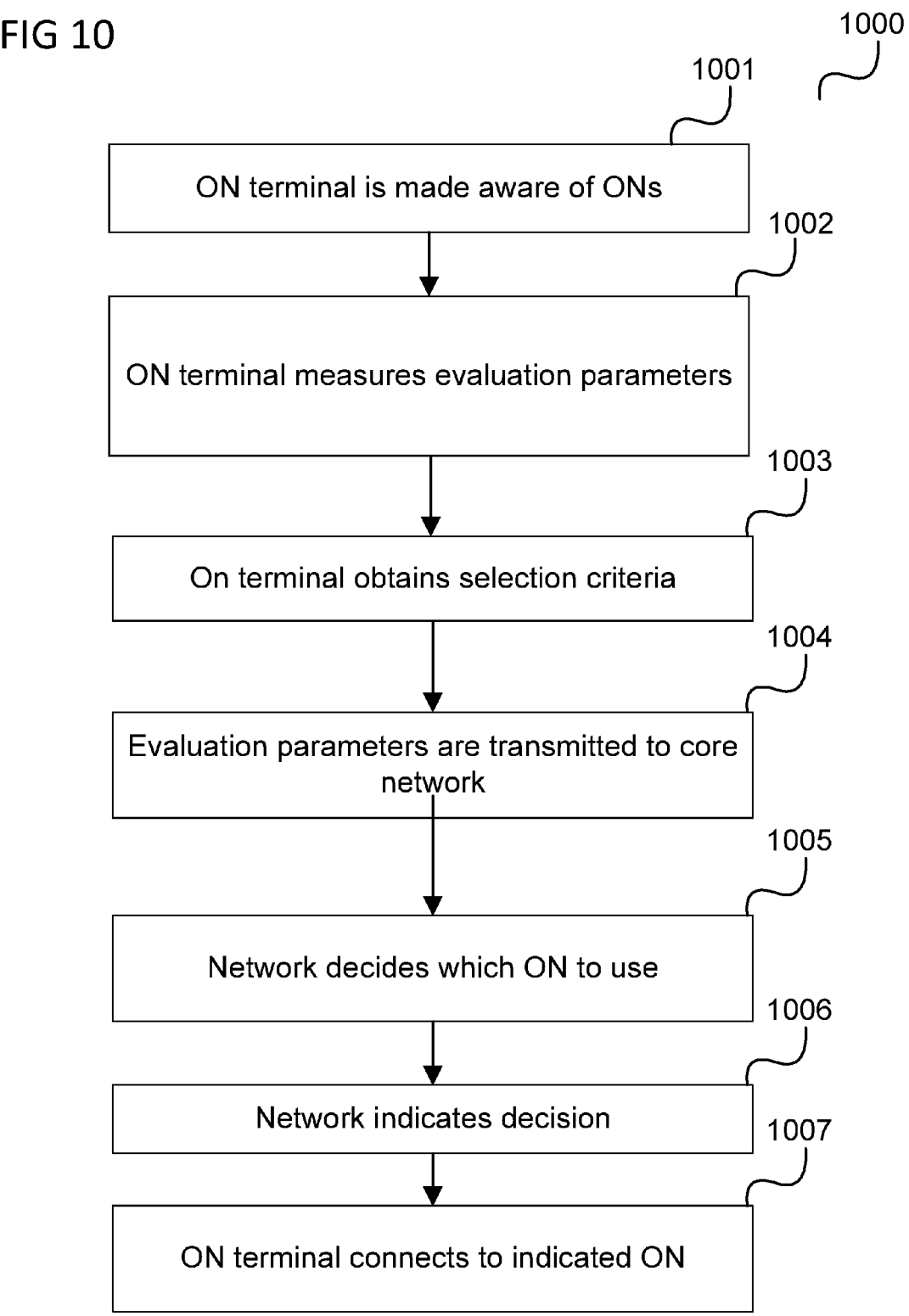
FIG. 10 shows a flow diagram according to an embodiment.

FIG. 10 shows a flow diagram 1000 according to an embodiment.

In 1001, the ON-Terminal is made aware of available ONs (e.g., by means of a message from the infrastructure containing a dedicated measurement configuration).

In 1002, the ON terminal measures properties and parameters (as described above) required for ON selection.

In 1003, the ON terminal obtains the specification of one or more ON selection criteria from, for example
  the eNB via System Information over the cellular radio link, or
  the relaying-node via data broadcast over the short range link, or
  upon request from the relaying-node, or
  upon request from the eNB.
The ON selection criteria may alternatively be also pre-stored in the ON terminal or in a SIM (Subscriber Identity Module) or USIM (UMTS Subscriber Identity Module), i.e. generally speaking in a chip or chip card that may either be connected to the ON terminal (e.g., plugged in) or is embedded therein.

In 1004, properties and parameters are transmitted from the ON terminal to the core network:
  a) If the ON terminal is connected via cellular radio link, the ON terminal transmits parameters via eNB to the Core Network.
  b) If the ON terminal is connected via short range link, the ON terminal transmits parameters via its active relaying node to the Core Network.

In 1005, the network side (infrastructure) decides which ON the ON terminal should to use (or whether to use any of the available (e.g. offered) ONs at all).

In 1006, the network side indicates its decision to the ON terminal.

In 1007, the ON terminal connects to the ON indicated by the network side (if an ON has been indicated at all to the ON terminal).

In the following, a procedure for ON selection for a UE in RRC_IDLE state (which is the (possible) ON terminal in this case) is described with reference to FIG. 11.

Figure 11:
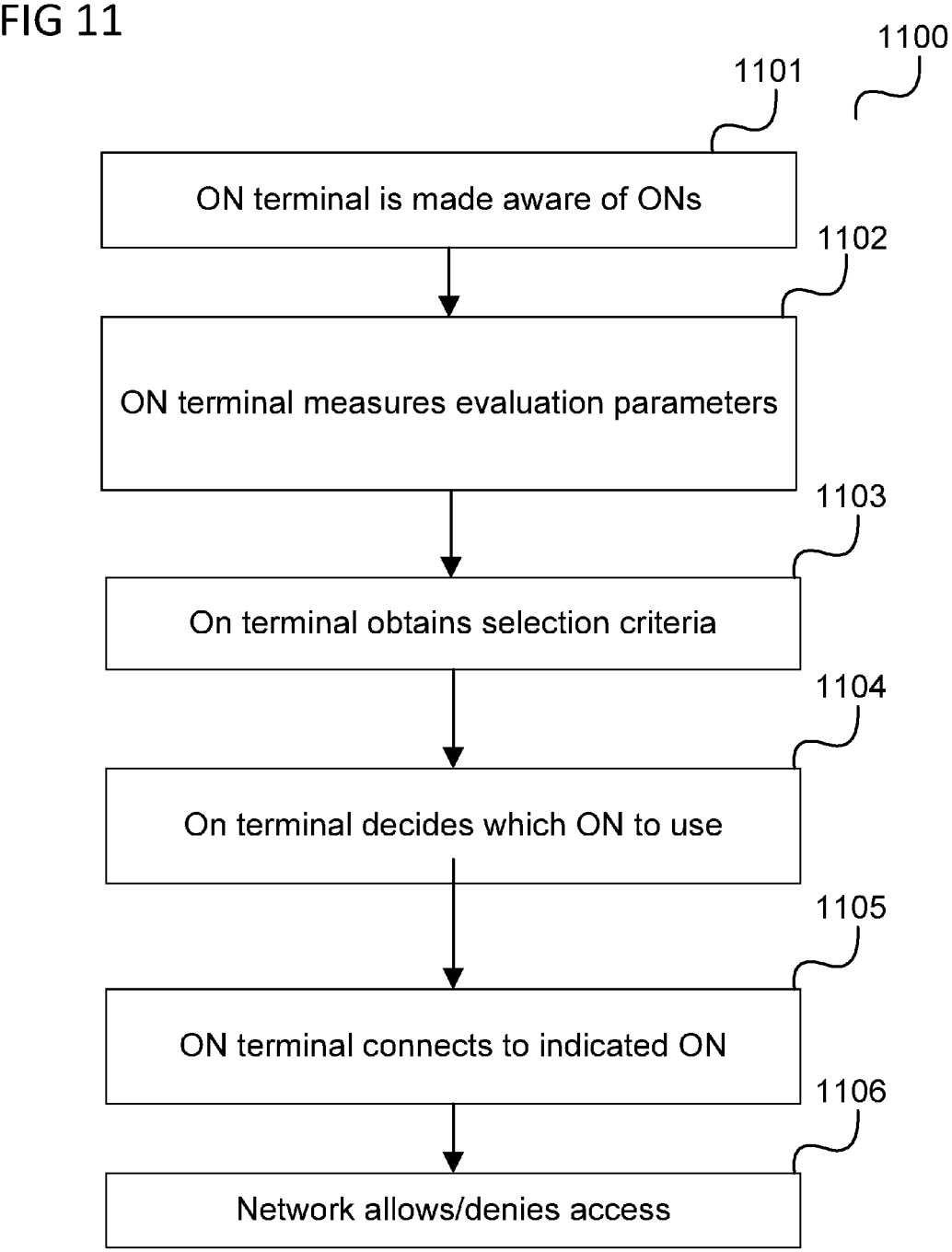
FIG. 11 shows a flow diagram according to an embodiment.

FIG. 11 shows a flow diagram 1100 according to an embodiment.

In 1101, the ON-Terminal is made aware of available ONs (e.g., by means of broadcast info from the base station containing measurement configurations for all mobile terminals in RRC_IDLE state).

In 1102, the ON-Terminal measures properties and parameters (e.g. one or more of the parameters as described above) to be used for ON selection.

In 1103, the ON terminal obtains one or more ON selection criteria from
  the eNB via System Information over the cellular radio link, or
  the relaying-node via data broadcast over the short range link, or
  upon request from the relaying-node.
The ON selection criteria may alternatively be also pre-stored in the ON terminal or in a SIM (Subscriber Identity Module) or USIM (UMTS Subscriber Identity Module), i.e. generally speaking in a chip or chip card that may either be connected to the ON terminal (e.g., plugged in) or is embedded therein.

In 1104, the ON terminal decides autonomously which ON to use (or whether to use any of the offered ONs at all). For this, no exchange of information with the network side (infrastructure) is needed.

In 1105, the ON terminal connects to the selected ON (if it was decided that an ON is to be used).

In 1106, the network side may make the final decision as to whether an access to the ON is granted to the ON terminal For example, the relaying node, under the control of the network side, may or may not grant access to the ON for the ON terminal.

In the following, an example of an ON selection by a moving UE in RRC_CONNECTED state which detects two ONs on its way is described with reference to FIG. 12.

Figure 12:
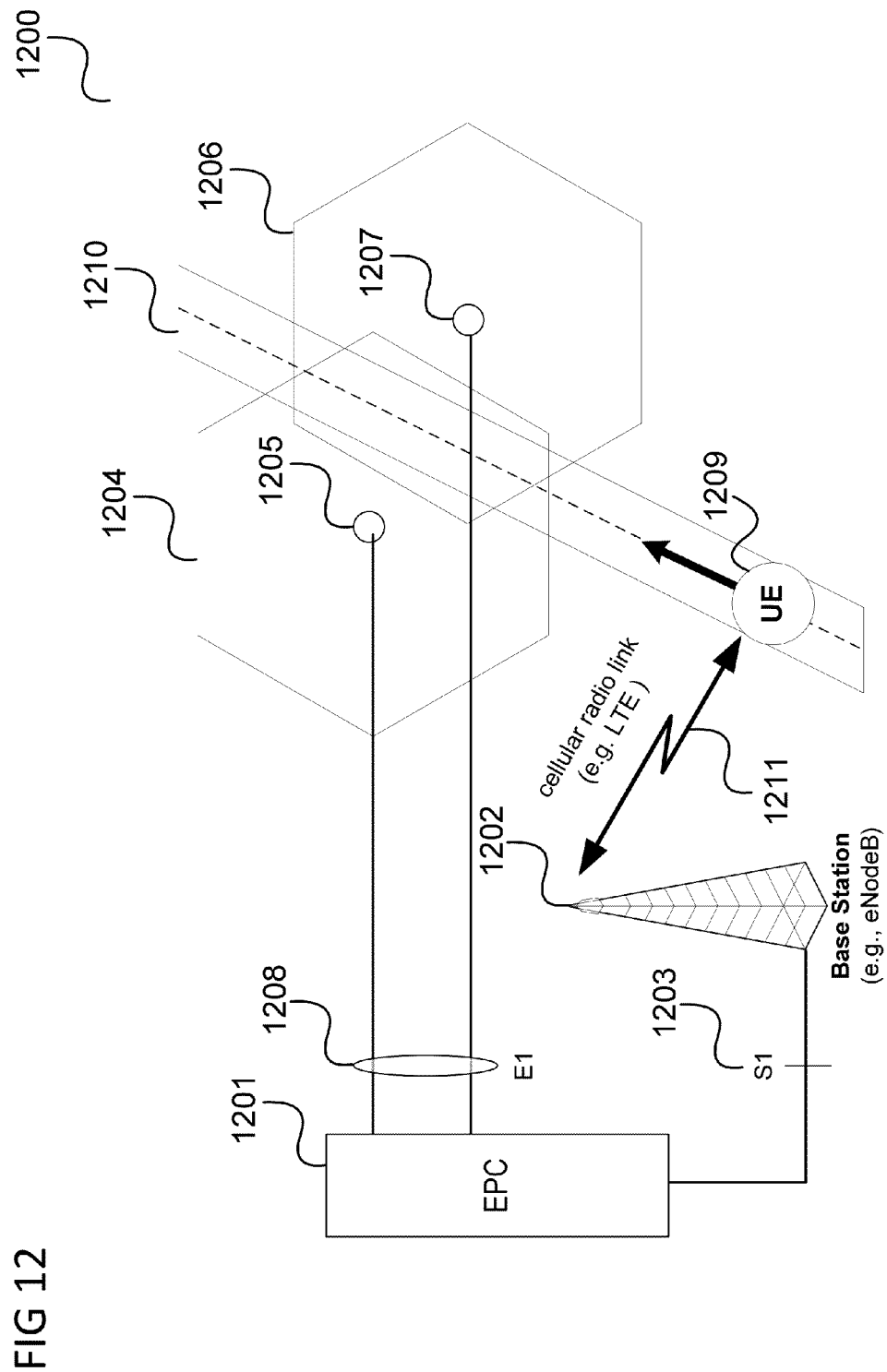
FIG. 12 shows a communication arrangement according to an embodiment.

FIG. 12 shows a communication arrangement 1200 according to an embodiment.

Similarly to the communication system 700, the communication arrangement 1200 includes a core network (EPC) 1201, a base station 1202 connected to the core network by an S1 interface 1203, a first opportunistic network 1204 (indicated in FIG. 12 by its coverage area) operated by a first relaying node 1205, and a second opportunistic network 1206 (indicated in FIG. 12 by its coverage area) operated by second relaying node 1207. The relaying nodes 1205, 1207 are for example connected to the EPC 1201 by means of an E1 interface 1208.

It is assumed that a 3GPP LTE UE 1209 in RRC_CONNECTED state is moving along a road 1210 at a certain speed. The UE 1209 is assumed to have a steady LTE connection 1211 to the base station 1202 of the cellular communications system via its cellular modem and resides in RRC_CONNECTED state. After a few miles the UE 1209 is assumed to enter the coverage areas of two opportunistic networks 1204, 1206. The first opportunistic network 1204 (ON-A) is assumed to be characterized by a first set of properties (PS-A) and is served by the first relaying node 1205 and the second opportunistic network 1206 (ON-B) is assumed to be characterized by a second set of properties (PS-B) and is served by the second relaying node 1207.

Each relaying node 1205, 1207 has a connection to the EPC via the E1 Interface 1208. It should be noted that the E1 interface 1208 may include a base station and an S1 interface of the cellular radio communication network.

It is assumed that the UE 1209 detects the two ONs 1204, 1206, for example by receiving a dedicated measurement configuration for these ONs from its serving base station (eNB) 1202 and starts performing measurements on the ONs 1204, 1206. In detail, it for example starts measuring certain properties and parameters that are required for ON selection according to the metric $M_1$. In this example, the UE 1209 obtains the information needed to calculate the metric $M_1$ for the first opportunistic network 1204 (referred to as $M_{1A}$) and for the second opportunistic network 1206 (referred to as M1B) from the relaying nodes 1205, 1207 via data broadcast over respective short range radio links.

In this embodiment, as final decision making does not fall into the responsibilities of the UE 1209 (because it is in RRC_CONNECTED state) the UE 1209 calculates only a part (i.e. a component) of the metric (i.e. the value of $M_1$ rather than the value of $M_{res}$) for each ON 1204, 1206 and transmits its two findings ($M_{1A}$ and $M_{1B}$) via the cellular radio link 1211 and the backhaul link 1203 to the network side for further processing. If required for the decision making, each relaying node 1205, 1207 calculates a second metric part $M_2$ of the resulting metric and sends the results ($M_{2A}$ for the first opportunistic network 1204 and $M_{2B}$ for the second opportunistic network) to the network side.

In this example the final ON selection decision takes place in an MME of the core network 1201 where all sub metric values (i.e. metric parts) $M_{1A}$, $M_{1B}$, $M_{2A}$, and $M_{2B}$ are collected, assessed and merged and an ON selection instruction for the UE 1209 is constructed and sent to the UE 1209 over the cellular radio interface (e.g. via communication connection 1211). The UE 1209 then tries to connect to the selected ON as a new ON terminal. Assuming that the metrics have been chosen in an appropriate way, the UE's communication needs can be accommodated satisfactorily.

The MME's decision in favor of one ON over the other could in this example for instance be based on property differences pertaining to the minimum guaranteed bit rates on the different cellular interfaces between the two relaying nodes 1205, 1207 and their infrastructure counterpart(s) (i.e. interface E1), or the different reliability indexes that may express how many ON terminals got lost during the last operation period and/or how many of these lost connections could be restored without much delay.

In the following, an example of an ON selection by a stationary UE in RRC_IDLE state which detects the formation of a new ON in its vicinity is described with reference to FIG. 13.

Figure 13:
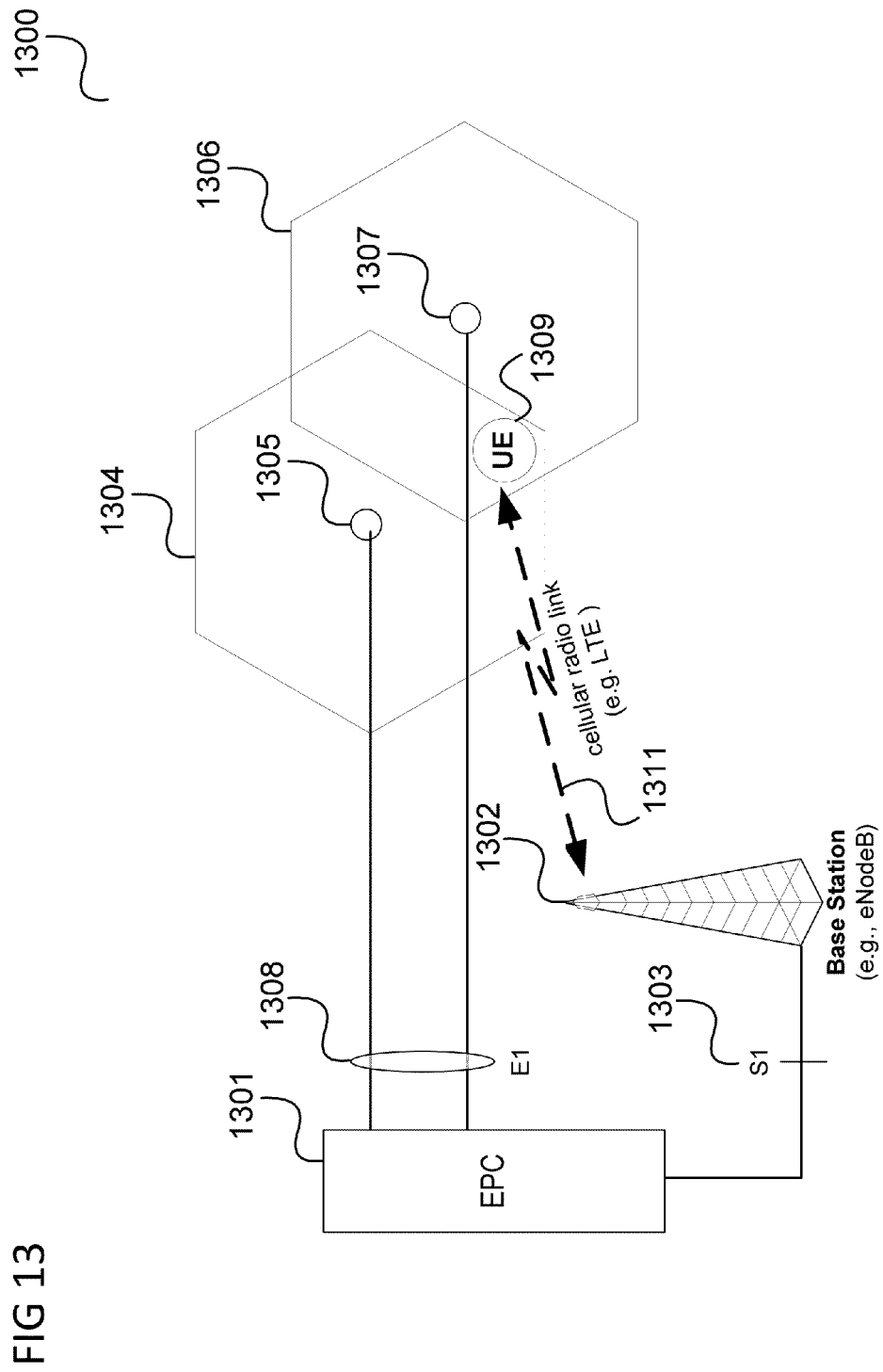
FIG. 13 shows a communication arrangement according to an embodiment.

FIG. 13 shows a communication arrangement 1300 according to an embodiment.

Similarly to the communication system 700, the communication arrangement 1300 includes a core network (EPC) 1301, a base station 1302 connected to the core network by an S1 interface 1303, a first opportunistic network 1304 (indicated by its coverage area) operated by a first relaying node 1305, and a second opportunistic network 1306 (indicated by its coverage area) operated by second relaying node 1307. The relaying nodes 1305, 1307 are for example connected to the EPC 1301 by means of an E1 interface 1308.

In this example, it is assumed that a 3GPP LTE UE 1309 is (more or less) stationary and resides in RRC_IDLE state, i.e. it does not have an active connection to one of the base stations of the cellular communications system (including for example the base station 1302 and the core network 1301) but it is page-able in case of downlink data arrival and it may send tracking area updates (TAUS) to the network side should the need arise.

In contrast to the active connection 1211 (UE in RRC_CONNECTED state) in FIG. 12 of the previous example, the inactive connection 1311 (UE in RRC_IDLE state) in FIG. 13 of this example is represented by a dashed line.

Additionally, the UE 1309 is in the coverage area of the first ON 1304 that is assumed to be characterized by a first set of properties (PS-A). The first ON 1304 (ON-A) is served by the first relaying node 1305 and is assumed to have already been measured by the UE 1309, i.e. an evaluation metric (e.g. $M_{res}$ as above) is already available for comparison (e.g. in the UE 1309) of the suitability of a communication connection provided by the first opportunistic network 1304 with a communication connection provided by other means. The value of the evaluation metric for the first opportunistic network 1304 is referred to as $M_{resA}$.

It is assumed that after some time the UE 1309 detects the presence (or formation) of the second ON 1306 assumed to be characterized by a second set of properties (PS-B). The second ON 1306 (ON-B) is served by the second relaying node 1307. It is further assumed that the UE 1309 detects the presence of the ONs 1304, 1306 for example by receiving system information broadcast from the base station 1302 containing measurement configurations for all UEs in RRC IDLE. For example, as soon as the (new) second ON 1306 (ON-B) is up and running the system information broadcast is updated. The UE 1309 uses the measurement configuration received from the base station in RRC_IDLE and starts performing measurements on the second ON 1306 (ON-B). Specifically, it starts measuring certain properties and parameters that are required for the ON selection process, for example according to the metric component M1 (referred to as $M_{1B}$ for the second ON 1306).

The relaying nodes 1305, 1307 each have a connection to the EPC 1301 via the E1 interface 1308 (which may for example include a base station and an S1 interface). In this example, the UE 1309 obtains the information needed to calculate $M_1$ for the first ON 1304 (referred to as $M_{1A}$) and $M_1$ for the second ON 1305 (referred to as $M_{1B}$) from (e.g. only from) the relaying nodes 1305, 1307 via data broadcast over the two short range links. As in this embodiment, final decision making falls into the responsibilities of the UE 1309 (because it is in RRC_IDLE), the UE 1309 calculates the resulting metrics for the ONs 1304, 1306. In this example, the resulting metrics are equal to the metric components $M_{1A}$, $M_{1B}$, i.e. $M_{resA} = M_{1A}$ and $M_{resB} = M_{1B}$.

In this example, the UE 1309 does not transmit its findings via a cellular radio link 1311 (to be established) to the network side for further processing as this would require a state transition to RRC_CONNECTED state (for the establishment of an RRC connection). In this example, the final ON selection decision takes place in the UE 1309 itself where the resulting metrics $M_{resA}$ and $M_{resB}$ are collected and assessed. The UE 1309 then tries to connect to the selected ON as a new ON terminal. This could be done immediately or when a connection to the core network 1301 is required. Assuming that the metrics were chosen in an appropriate way, the UE's communication needs can be accommodated satisfactorily without connecting to the base station 1302.

The UE's autonomous decision in favor of one ON over the other could in this example for instance be based on property differences pertaining to
- the different battery charging levels in the respective relaying nodes 1304, 1306, or
- the different signal strengths of reception signals from the relaying node 1304, 1306.

In the following, an example is described in which the trustworthiness of an opportunistic network is used as the predominant selection criterion.

One embodiment relates to the set-up of trusted and untrusted ONs. For example, in the communication system 700, the first opportunistic network 709 may fully rely on the network components that are controlled by the concerned MNO (i.e. the relaying node 704 of the first opportunistic network 709 is an operator controlled component, in this case for example a subscriber terminal of the mobile radio communication system).

On the other hand, also other network components for licensed or unlicensed spectrum usage (such as WiFi access points) that are operated by a different MNO or a third party service provider can be used for communication within an opportunistic network and can also serve as a gateway or relaying-node. In this case, the ON may be considered to be not trustworthy. For example, instead of the fifth mobile terminal 705 operating as relaying node for the second opportunistic network 710, the second opportunistic network 710 may for example be operated by a WiFi Node and may thus not be regarded as being trustworthy.

For example, while the first opportunistic network 709 is used for both non-security critical information and security-critical information, the second opportunistic network 710 is in this case only used for non-security critical information.

According to one embodiment, the procedure in a scenario with a trusted and a non-trusted opportunistic network relates to several phases of the set-up of the network:
- During a start-up phase (e.g. a setup of an ON), it is negotiated between participating network nodes whether a trusted or an untrusted ON is required/available. In the case that an untrusted ON is sufficient, the most suitable network nodes are identified taking all available types of network access points and base stations into account (for example a WiFi access point can be chosen for acting as a relaying node). If a trusted ON is required, only network nodes are used for providing the ON that are under control of the concerned operator and that are deemed sufficiently secure.
- If a mobile terminal intends to join an existing ON, in case of a trusted ON it is first checked whether the mobile terminal introduces trust issues. If not, the mobile terminal is admitted to the ON. In case of an untrusted ON, any type of new user is admitted.

When it comes to advertising properties in an ON system, certain requirements may be considered with regard to trustworthiness. For example, an ON node may not believe another ON node that is not trustworthy when it claims that it is trustworthy. Property advertisements pertaining to security aspects in an ON system may therefore for example be signed digitally by a trustworthy node, so that the receiving entity can derive information about the integrity of the data and about the originating node of the advertisement by validating the signature.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A network selection device comprising:
   a determining circuit configured to determine an expected suitability level of a communication connection of an opportunistic network for a communication terminal provided by means of a cellular radio communication network and by means of a relaying subscriber terminal of the cellular radio communication network;
   wherein the relaying subscriber terminal is configured to offer spontaneous coverage extensions by means of the communication connection for a certain limited time; and
   a decider configured to decide, based on the determined expected suitability level, whether the communication terminal should use a communication connection provided by means of the cellular radio communication network and by means of the relaying subscriber terminal of the cellular radio communication network.

2. The network selection device according to claim 1, wherein the determining circuit is configured to determine the expected suitability level in accordance with a suitability criterion.

3. The network selection device according to claim 1, further comprising a requesting circuit configured to request the establishment of a communication connection provided by means of the cellular radio communication network and by means of the relaying subscriber terminal if it has been decided by the decider that the communication terminal should use a communication connection provided by means of the cellular radio communication network and by means of the relaying subscriber terminal.

4. The network selection device according to claim 1, wherein the communication connection is a communication connection to a core network of the cellular radio communication network.

5. The network selection device according to claim 1, wherein the decider is configured to decide whether the communication terminal should use a communication connection provided by means of the cellular radio communication network and by means of the relaying subscriber terminal based on a comparison of the determined expected suitability level with the expected suitability level of another communication connection.

6. The network selection device according to claim 5, wherein the other communication connection is a communication connection to a core network of the cellular radio communication network.

7. The network selection device according to claim 5, wherein the other communication connection is provided by means of the cellular radio communication network.

8. The network selection device according to claim 7, wherein the other communication connection is provided by means of another relaying subscriber terminal of the cellular radio communication network.

9. The network selection device according to claim 1, further comprising a receiver configured to receive information based on which the expected suitability level can be determined and wherein the determining circuit is configured to determine the expected suitability level based on the received information.

10. The network selection device according to claim 9, wherein the receiver is configured to receive the information from the communication terminal.

11. The network selection device according to claim 9, wherein the information includes at least one parameter describing a characteristic of relaying subscriber terminal.

12. The network selection device according to claim 9, wherein the information includes at least one parameter describing the expected transmission quality of the communication connection.

13. The network selection device according to claim 9, wherein the information includes information about at least one of the expected reliability of the communication connection and the trustworthiness of the relaying subscriber terminal.

14. The network selection device according to claim 9, wherein the information includes information based on which the expected suitability of the radio connection between the communication terminal and relaying subscriber terminal and the expected suitability of the radio connection between the relaying subscriber terminal and a radio access network of cellular radio communication network can be determined.

15. The network selection device according to claim 1, wherein the relaying subscriber terminal has a radio connection to a base station of a radio access network of the cellular radio communication network.

16. The network selection device according to claim 1, being part of the communication terminal.

17. The network selection device according to claim 16, further comprising a receiver configured to receive an indication of the expected suitability level from the cellular radio communication network and wherein the determining circuit is configured to determine the expected suitability level based on the received indication.

18. The network selection device according to claim 1, being part of the cellular radio communication network.

19. The network selection device according to claim 18, further comprising a transmitter configured to transmit a message to the communication terminal to request the communication terminal to establish a communication connection provided by means of the cellular radio communication network and by means of the relaying subscriber terminal if it has been decided that the communication terminal should use a communication connection provided by means of the cellular radio communication network and by means of the relaying subscriber terminal.

20. The network selection device according to claim 1, wherein the decider is further configured to decide, based on a further criterion whether certain network components of the cellular radio communication network and the relaying subscriber terminal providing the communication connection can be used for providing the communication connection.

21. The network selection device according to claim 1, wherein the further criterion includes information about either selecting one communication connection provided by all available network components of the cellular radio communication network or one communication connection provided by network components of the cellular radio communication network that are under control of a mobile network operator and which are deemed secure by the mobile network operator.

22. A method for selecting a communication network comprising:
    determining an expected suitability level of a communication connection of an opportunistic network for a communication terminal provided by means of a cellular radio communication network and by means of a relaying subscriber terminal of the cellular radio communication network;
    offering spontaneous coverage extensions by means of the communication connectionl for a certain limited time; and
    determining, based on the determined expected suitability level, whether the communication terminal should use a communication connection provided by means of the cellular radio communication network and by means of the relaying subscriber terminal of the cellular radio communication network.

23. A communication device comprising
    a ascertaining circuit configured to ascertain information based on which an expected suitability level of a communication connection for a communication terminal provided by means of a cellular radio communication network and by means of a relaying subscriber terminal of the cellular radio communication network can be determined; and
    a transmitter configured to transmit the information to the network selection device of claim 1.

24. A communication device comprising
    a ascertaining circuit configured to ascertain information based on which an expected suitability level of a communication connection for a communication terminal provided by means of a cellular radio communication network and by means of a relaying subscriber terminal of the cellular radio communication network can be determined; and
    a transmitter configured to transmit the information to the network selection device of claim 1.

25. A method for providing network selection information comprising
    ascertaining information based on which an expected suitability level of a communication connection for a communication terminal provided by means of a cellular radio communication network and by means of a relaying subscriber terminal of the cellular radio communication network can be determined; and
    transmitting the information to the network selection device of claim 1.

26. A network selection device comprising:
- a determining circuit configured to determine an expected suitability level of a communication connection for a communication terminal provided by means of a cellular radio communication network and by means of a relaying subscriber terminal of the cellular radio communication network;
- wherein the determination of the suitability level is based on a reliability index; wherein the reliability index is calculated for every relaying node reflecting how stable recent communication connections between at least one of the relaying nodes and one or more other communication terminals and the relaying node and the communication network have been during a predefined time span; and
- a decider configured to decide, based on the determined expected suitability level, whether the communication terminal should use a communication connection provided by means of the cellular radio communication network and by means of the relaying subscriber terminal of the cellular radio communication network.

27. The network selection device according to claim 26, wherein the number of successful or unsuccessful connection re-establishment attempts of one or more communication terminals is considered for the calculation of the reliability index.

28. The network selection device according to claim 26, wherein the determination of the suitability index is further based on a criterion, wherein the criterion describes an offset value of the received signal strength, configured to avoid a selection ping-pong between different opportunistic networks.

29. The network selection device according to claim 26, wherein the determination of the suitability index is further based on a criterion, wherein the criterion describes an further offset value of the received signal strength, configured to prioritize the selection of an opportunistic network over a macro cell selection.

30. A method for selecting a communication network comprising:
- determining an expected suitability level of a communication connection for a communication terminal provided by means of a cellular radio communication network and by means of a relaying subscriber terminal of the cellular radio communication network;
- wherein determining of the suitability level is based on a reliability index;
- wherein the reliability index is calculated for every potential relaying node reflecting how stable recent communication connections between at least one of the relaying node and one or more other communication terminals and the relaying node and the communication network have been during a predefined time span; and
- determining, based on the determined expected suitability level, whether the communication terminal should use a communication connection provided by means of the cellular radio communication network and by means of the relaying subscriber terminal of the cellular radio communication network.

* * * * *